US010079122B2

(12) United States Patent
Kinsel et al.

(10) Patent No.: US 10,079,122 B2

(45) Date of Patent: Sep. 18, 2018

(54) MONITORING AND RESPONDING TO AN ABNORMAL CONDITION ASSOCIATED WITH ENERGIZING OF POLES OF A CIRCUIT BREAKER

(71) Applicant: Siemens Industry, Inc., Alpharetta, GA (US)

(72) Inventors: Hugh T. Kinsel, Sugar Hill, GA (US); Brian Timothy McCoy, Lawrenceville, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 261 days.

(21) Appl. No.: 15/253,031

(22) Filed: Aug. 31, 2016

(65) Prior Publication Data

US 2018/0061592 A1 Mar. 1, 2018

(51) Int. Cl.

| | |
|---|---|
| ***H02H 9/00*** | (2006.01) |
| ***H02H 9/04*** | (2006.01) |
| ***H01H 9/54*** | (2006.01) |
| ***H01H 71/24*** | (2006.01) |
| ***H01H 71/10*** | (2006.01) |
| ***H01H 83/22*** | (2006.01) |
| *H01H 71/50* | (2006.01) |
| *H01H 83/20* | (2006.01) |

(52) U.S. Cl.

CPC .......... *H01H 9/54* (2013.01); *H01H 71/1009* (2013.01); *H01H 71/24* (2013.01); *H01H 83/22* (2013.01); *H01H 71/1018* (2013.01); *H01H 71/1027* (2013.01); *H01H 71/501* (2013.01); *H01H 2083/201* (2013.01)

(58) Field of Classification Search

CPC ............... H02H 3/08; H02H 9/00; H02H 9/04

USPC ........................................................ 361/170

See application file for complete search history.

(56) References Cited

U.S. PATENT DOCUMENTS

2010/0020453 A1* 1/2010 McCoy .............. H01H 71/1018 361/42

FOREIGN PATENT DOCUMENTS

| | | |
|---|---|---|
| DE | 19830017 A1 | 12/1999 |
| EP | 2851925 A1 | 3/2015 |

OTHER PUBLICATIONS

EP2851925; Entire specificaton, claims, drawings.*

(Continued)

*Primary Examiner* — Dharti Patel

(57) ABSTRACT

A multi-pole circuit interrupter configured to be coupled between an AC source and an electric load electronically detects a hazardous condition associated with energizing of poles and responds to overcome the hazardous condition using a solenoid. The multi-pole circuit interrupter comprises a first switch to energize a first pole on a phase A conductor of the multi-pole circuit interrupter and a second switch to energize a second pole on a phase B conductor of the multi-pole circuit interrupter. The multi-pole circuit interrupter further comprises an electronic solid-state circuit coupled to the phase A conductor and the phase B conductor to detect a line voltage variation and control a current to a device in response to trip an energized pole among the first pole and the second pole if only one of the first pole and the second pole is energized when a user controls a tie bar to turn ON or turn OFF the multi-pole circuit interrupter or when a trip bar fails to trip one of the first pole and the second pole.

20 Claims, 17 Drawing Sheets

(56) References Cited

OTHER PUBLICATIONS

DE 198 30 017; Entire specification, claims, drawings.*
PCT International Search Report and Written Opinion of International Searching Authority dated Oct. 25, 2017 corresponding to PCT International Application No. PCT/US2017/045058 filed Aug. 2, 2017.

* cited by examiner

MONITORING AND RESPONDING TO AN ABNORMAL CONDITION ASSOCIATED WITH ENERGIZING OF POLES OF A CIRCUIT BREAKER

BACKGROUND

1. Field

Aspects of the present invention generally relate to detecting and handling of an abnormal condition associated with energizing of poles of a circuit breaker and more specifically relates to monitoring and responding to a trip failure in a multi-pole circuit interrupter.

2. Description of the Related Art

Electrical circuit branches of single-phase AC power systems typically use electrical cables that include a line conductor and a neutral conductor coupled between a source and a load, with the neutral conductor grounded at the source. Ground fault circuit interrupt ("GFCI") devices are installed in such circuit branches to interrupt power upon detection of ground current faults from the line conductor to ground at the load, as well as grounded neutral faults (e.g., low impedance connection faults) between the neutral conductor and ground at the load. GFCI devices provide safety protection from electrocution, and are primarily used in receptacles in kitchens, bathrooms and outdoor areas where water or moisture can pose a risk of electrocution. GFCI devices are also used in circuit breakers that protect these same areas.

Electrical arcs can develop temperatures well above the ignition level of most common flammable materials and, therefore, pose a significant fire hazard. Two types of dangerous arcing that are likely to occur in the home are momentary, high-energy arcs caused by high-current faults and persistent, low-current "contact" arcing. A high-current fault, caused by an inadvertent direct connection between line and neutral or line and ground, will generally draw current up to or beyond the rated capacity of the circuit, arc explosively as the contacts are physically made and broken, dim lights and other loads indicating an excessive load is being drawn, and/or (assuming the circuit is properly protected by a circuit breaker) trip the breaker, thereby interrupting the current to the arc. Contact arcing, on the other hand, is arcing that occurs at connections in series with a load. As such, the maximum current in the arc is limited to the load current and, therefore, may be substantially below the over-current or "trip" rating of an associated circuit breaker. Arc fault circuit interrupt ("AFCI") devices are used in circuit breakers which are installed to prevent dangerous conditions due to high-energy arcs and contact arcing.

A two-pole circuit interrupter is constructed by pairing two single pole circuit interrupters into one construction. The two-pole circuit interrupter could be a traditional circuit interrupter or an electronic circuit interrupter that detects ground faults and/or arc faults as well as over current conditions of equipment electrically coupled as a load to the two-pole circuit interrupter.

Typically there is a "trip bar" mechanically coupling the "trip arm" of one of the single pole circuit interrupters to the "trip arm" of the other circuit interrupter so that both poles trip OFF together should one of the circuit interrupters trip due to an over current condition. Also, typically there is a tie bar mechanically coupling the handle of one of the single pole circuit interrupters to the handle of the other single pole circuit interrupter so that both poles turn ON and OFF together.

However, sometimes the trip bar fails to trip the other single pole circuit interrupter due to "wear and tear" and environmental stress of the trip bar and other mechanical components. Sometimes one pole fails to turn ON or turn OFF when the user controls the handle and the tie bar of the two-pole circuit interrupter.

In either of the two cases above, such failure results in an unintended abnormal condition of one pole that is energized while the other pole is not energized. This condition could be hazardous to equipment electrically coupled as a load to the two-pole circuit interrupter, or to a user who is working with equipment electrically coupled as a load to the two-pole circuit interrupter.

Therefore, there is a need for improvements to handling of common trip failures, such as improvements in multi-pole circuit interrupter systems and devices to monitor the poles electronically for preventing a dangerous situation involving energizing or non-energizing of poles.

SUMMARY

Briefly described, aspects of the present invention relate to multi-pole circuit breakers or circuit interrupters such as residential two-pole circuit breakers that provide a mechanism to monitor for common trip and attempt to trip the circuit breaker or at least warn a user when a condition exists where one pole is not energized, but the other pole is energized. In particular, embodiments of the present invention remedy this dangerous condition by monitoring the two poles electronically and then tripping the energized pole by energizing a solenoid that strikes a trip bar. Thus, the two-pole circuit breaker prevents a dangerous situation where one pole is OFF but the other pole remains energized or ON. One of ordinary skill in the art appreciates that such a safety system can be configured to be installed in different environments where such protection is needed, for example, in GFCI and AFCI circuit breakers.

In accordance with one illustrative embodiment of the present invention, a multi-pole circuit interrupter configured to be coupled between an AC source and an electric load is provided. The multi-pole circuit interrupter comprises a tie bar mechanically coupling a first handle of a first pole circuit interrupter of the multi-pole circuit interrupter to a second handle of a second pole circuit interrupter of the multi-pole circuit interrupter so that both poles turn ON and OFF together. The multi-pole circuit interrupter further comprises a trip bar mechanically coupling a first trip arm of the first pole circuit interrupter to a second trip arm of the second pole circuit interrupter so that the both poles trip OFF together should one of the first pole circuit interrupter or the second pole circuit interrupter trip due to an over current condition. The multi-pole circuit interrupter further comprises a first switch to energize a first pole on a phase A conductor of the multi-pole circuit interrupter and a second switch to energize a second pole on a phase B conductor of the multi-pole circuit interrupter. The multi-pole circuit interrupter further comprises an electronic solid-state circuit coupled to the phase A conductor and the phase B conductor to detect a line voltage variation and control a current to a device in response to trip an energized pole among the first pole and the second pole if only one of the first pole and the second pole is energized when a user controls the tie bar to turn ON or turn OFF the multi-pole circuit interrupter or when the trip bar fails to trip one of the first pole and the second pole.

In accordance with another illustrative embodiment of the present invention, a multi-pole circuit interrupter configured to be coupled between a source and a load is provided. The multi-pole circuit interrupter comprises a first switch to energize a first pole on a phase A conductor of the multi-pole circuit interrupter and a second switch to energize a second pole on a phase B conductor of the multi-pole circuit interrupter. The multi-pole circuit interrupter further comprises a first line voltage detection circuit disposed on a load side of the first switch and the second switch. The first line voltage detection circuit is configured to detect a change in a voltage level of the phase A conductor. The multi-pole circuit interrupter further comprises a second line voltage detection circuit disposed on a load side of the first switch and the second switch. The second line voltage detection circuit is configured to detect a change in a voltage level of the phase B conductor. The multi-pole circuit interrupter further comprises a trip circuit configured to control a current to trip an energized pole among the first pole and the second pole if only one of the first pole and the second pole is energized when a user controls a tie bar to turn ON or turn OFF the multi-pole circuit interrupter or when a trip bar fails to trip one of the first pole and the second pole.

In accordance with yet another illustrative embodiment of the present invention, a method of handling an abnormal condition associated with energizing of poles of a circuit breaker is provided. The method comprises detecting a variation in a line voltage on a phase A conductor and a phase B conductor of a multi-pole circuit interrupter coupled between an AC source and an electric load, controlling a trip current to a solenoid disposed adjacent to a first switch configured to energize a first pole on the phase A conductor of the multi-pole circuit interrupter and a second switch configured to energize a second pole on the phase B conductor of the multi-pole circuit interrupter in response to the variation in the line voltage, and tripping an energized pole among the first pole and the second pole based on the trip current if only one of the first pole and the second pole is energized when a user controls a tie bar to turn on or turn off the multi-pole circuit interrupter or when a trip bar fails to trip one of the first pole and the second pole.

DETAILED DESCRIPTION

Figure 1:
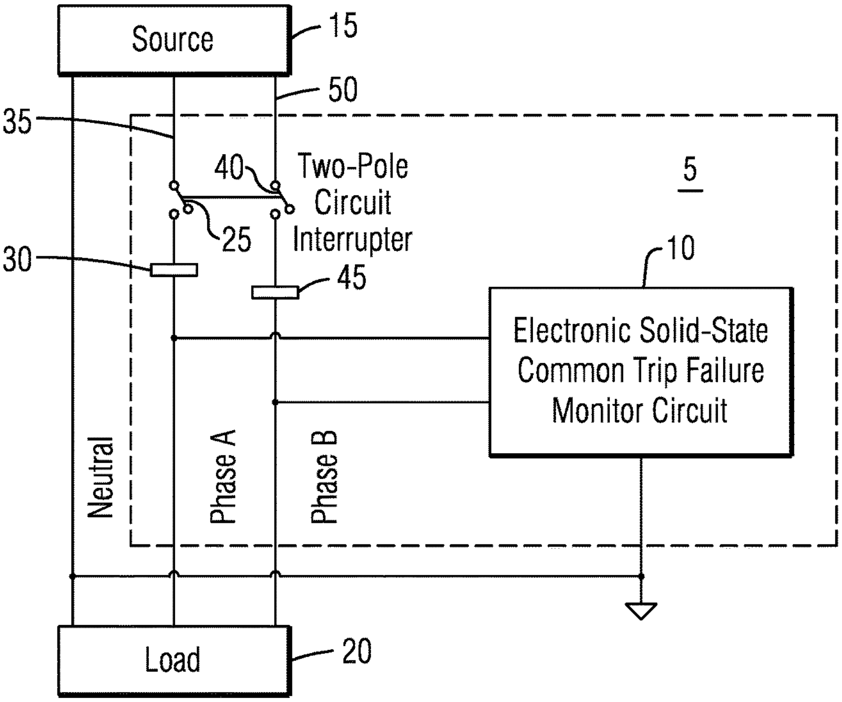
FIG. 1 illustrates a schematic diagram of a two-pole circuit interrupter including an electronic solid-state circuit that monitors a common trip failure when energizing poles of the two-pole circuit interrupter in accordance with one illustrative embodiment of the present invention.

To facilitate an understanding of embodiments, principles, and features of the present invention, they are explained hereinafter with reference to implementation in illustrative embodiments. In particular, they are described in the context of detecting an abnormal condition associated with energizing of poles of a circuit breaker by electronically monitoring a trip failure in that one pole is energized, but the other pole is not energized and handling this abnormal condition by responding to the trip failure with tripping of the energized pole by energizing a solenoid that strikes a trip bar in the multi-pole circuit interrupter. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

An abnormal condition monitoring and response system is provided for detecting and handling a common trip failure associated with erroneous or improper energizing of poles of a circuit breaker such as a multi-pole GFCI or AFCI circuit interrupter. The system comprises an electronic solid-state common trip failure monitor circuit that controls a solenoid assembly to trip the energized pole when the other pole is not energized in a two-pole circuit interrupter. The solenoid assembly strikes a trip bar in the two-pole circuit interrupter. In this way, the two-pole circuit interrupter prevents an unsafe situation where one pole is OFF but the other pole remains energized or ON. Accordingly, a condition that could be hazardous to equipment electrically coupled as a load to the two-pole circuit interrupter may be avoided. A user who is working with equipment electrically coupled as a load to the two-pole circuit interrupter would be safe.

Accordingly, a safety feature is provided for circuit breakers such as a multi-pole GFCI or AFCI circuit interrupter. In one embodiment, a common trip failure associated with erroneous or improper energizing of poles of a circuit breaker is detected via an electronic solid-state common trip failure monitor circuit coupled to a phase A conductor, a phase B conductor and a neutral line when the circuit breaker is coupled between an AC source and an electrical equipment as a load. If a "trip bar" that mechanically couples a "trip arm" of one pole circuit interrupter to a "trip arm" of another pole circuit interrupter so that both poles trip OFF together should one of the circuit interrupters trip due to an over current condition does not trip OFF both poles, the electronic solid-state common trip failure monitor circuit would cause the energized pole to trip OFF. Also, if a "tie bar" that mechanically couples a handle of one of the pole circuit interrupters to a handle of the another pole circuit interrupter so that both poles turn ON and OFF together fails to do so, the electronic solid-state common trip failure monitor circuit would cause the energized pole to trip OFF. This solution provides protection to equipment electrically coupled as a load to the circuit breaker and ensures safety of user who is working with equipment electrically coupled as a load to the circuit breaker.

FIG. 1 illustrates a schematic diagram of a two-pole circuit interrupter 5 including an electronic solid-state common trip failure monitor circuit 10 for detecting an abnormal condition associated with energizing of poles of the two-pole circuit interrupter 5 and providing a driving current for tripping OFF an energized pole when another pole is not energized or turned ON simultaneously in accordance with one illustrative embodiment of the present invention. In particular, the electronic solid-state common trip failure monitor circuit 10 monitors a common trip failure when energizing poles of the two-pole circuit interrupter 5 in accordance with one illustrative embodiment of the present invention. The common trip failure occurs when one pole of the two-pole circuit interrupter 5 is OFF but the other pole remains energized or ON.

As used herein, the "two-pole circuit interrupter" refers to a multi-pole circuit breaker, as described herein, that corresponds to an automatically operated electrical switch designed to protect an electrical circuit from damage caused by overload or short circuit. Its basic function is to detect a fault condition and interrupt current flow. The "multi-pole circuit breaker," in addition to the exemplary hardware description above, refers to a device that is configured to reset (either manually or automatically) to resume normal operation. The "multi-pole circuit breaker," may be used to protect an individual household appliance up to a large switchgear designed to protect high voltage circuits feeding an entire city, and operated by a controller. It should be appreciated that several other components may be included in the "multi-pole circuit breaker." However, the function and use of such equipment for a circuit breaker application are well known in the art and are not discussed further. The "multi-pole circuit breaker," may be capable of operating based on its features such as voltage class, construction type, interrupting type, and structural features.

Suitable dual function circuit breakers model no. QFGA2 and MP-GAT2 those combine GFCI and AFCI functionality, protecting against both Arc Faults and Ground Faults are available from Siemens Industry Inc. located at 5400 Triangle Parkway, Norcross, Ga. 30092. Likewise, suitable Ground Fault Circuit Interrupters (GFCI) to protect against severe electrical shock or electrocution from ground faults are available. Arc Fault Circuit Interrupters (AFCI) and Combination Type Arc Fault Circuit Interrupters (CAFCI) are also available. A person skilled in the pertinent art would appreciate that other suitable circuit breakers may be readily deployed based on a specific implementation without departing from the scope of the present invention.

The two-pole circuit interrupter 5 is configured to be coupled between an AC source 15 and an electric load 20. The AC source 15 may be a single phase or a multi-phase source. For example, it may be a 240V or 208V two-phase AC source. The electric load 20 may be any electrical equipment needing protection from over current or short circuit. Examples of the electrical equipment include household appliances up to large switchgear designed to protect high voltage circuits feeding an entire city.

In one embodiment, the two-pole circuit interrupter 5 is an automatically operated electrical switch designed to protect an electrical circuit from damage caused by overload or short circuit. Its basic function is to detect a fault condition and interrupt current flow. The two-pole circuit interrupter 5 can be reset (either manually or automatically) to resume normal operation.

In the two-pole circuit interrupter 5, a tie bar (not shown) mechanically couples a first handle of a first pole circuit interrupter of the two-pole circuit interrupter to a second handle of a second pole circuit interrupter of the two-pole circuit interrupter so that both poles turn ON and OFF together. In the two-pole circuit interrupter 5, a trip bar (not shown) mechanically couples a first trip arm of the first pole circuit interrupter to a second trip arm of the second pole circuit interrupter so that the both poles trip OFF together should one of the first pole circuit interrupter or the second pole circuit interrupter trip due to an over current condition.

The two-pole circuit interrupter 5 includes a first switch 25 to energize a first pole 30 on a phase A conductor 35 of the two-pole circuit interrupter 5. The two-pole circuit interrupter 5 further includes a second switch 40 to energize a second pole 45 on a phase B conductor 50 of the two-pole circuit interrupter 5.

The electronic solid-state common trip failure monitor circuit 10 may be coupled to the first pole 30 on the phase A conductor 35 and the second pole 45 on the phase B conductor 50 to detect a line voltage variation and control a current to a device in response to the variation. The device such as a solenoid may trip OFF an energized pole among the first pole 30 and the second pole 45 if only one of the first pole 30 and the second pole 45 is energized when a user controls the tie bar to turn ON or turn OFF the two-pole circuit interrupter 5 or when the trip bar fails to trip one of the first pole 30 and the second pole 45.

Examples of the two-pole circuit interrupter 5 include a multi-pole circuit breaker with ground fault circuit interrupt ("GFCI") devices and/or arc fault circuit interrupt ("AFCI") devices. GFCI devices are installed in circuit branches to interrupt power upon detection of ground current faults from the line conductor to ground at the load, as well as grounded neutral faults (e.g., low impedance connection faults) between the neutral conductor and ground at the load. AFCI devices are installed to prevent dangerous conditions due to high-energy arcs and contact arcing.

While particular embodiments are described in terms of the two-pole circuit interrupter 5 as a circuit breaker, the techniques described herein are not limited to two-pole circuit interrupter but can be also used with other circuit interrupter, such as different types of multi-pole circuit breakers.

Figure 2:
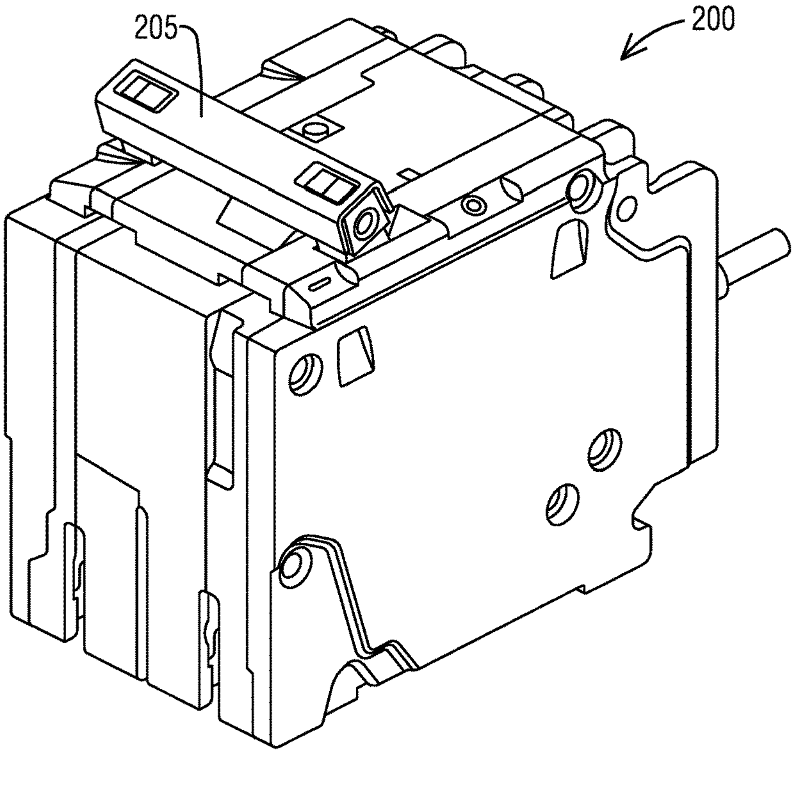
FIG. 2 illustrates an isometric view of a two-pole circuit interrupter with the circuit breaker in ON condition in accordance with one illustrative embodiment of the present invention.

Referring to FIG. 2, it illustrates an isometric view of a two-pole circuit interrupter 200 with the circuit breaker shown in an ON condition in accordance with one illustrative embodiment of the present invention. The two-pole circuit interrupter 200 includes a tie bar 205. The tie bar 205 is shown with the two-pole circuit interrupter 200 in the ON condition.

Figure 3:
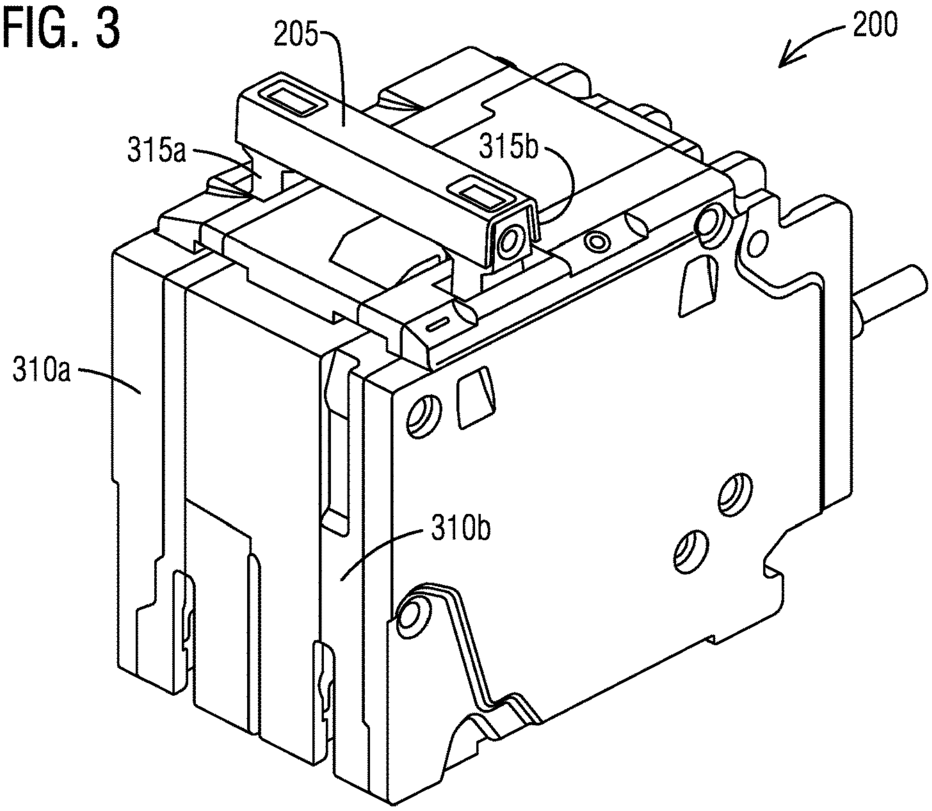
FIG. 3 illustrates an isometric view of the two-pole circuit interrupter of FIG. 2 with the circuit breaker in OFF or TRIPPED condition in accordance with one illustrative embodiment of the present invention.

Turning now to FIG. 3, it illustrates an isometric view of the two-pole circuit interrupter 200 of FIG. 2 with the circuit breaker shown in an OFF or TRIPPED condition in accordance with one illustrative embodiment of the present invention. The two-pole circuit interrupter 200 includes a first pole circuit interrupter **310*a* and a second pole circuit interrupter 310*b*. The first pole circuit interrupter 310*a* has a first handle 315*a* and the second pole circuit interrupter 310*b* has a second handle 315*b*. The tie bar 205 mechanically couples the first handle 315*a* of the first pole circuit interrupter 310*a* to the second handle 315*b* of the second pole circuit interrupter 310*b*** so that both poles turn ON and OFF together.

The function of the tie bar 205 is to ensure that the first handle **315*a* and the second handle 315*b* of the two-pole circuit interrupter 200 are in the same position (ON, OFF or TRIP). The primary function of the first handle 315*a* and the second handle 315*b* is to allow a user to manually position the two-pole circuit interrupter 200 either in the ON (closed) or OFF (open) position. The secondary function of the first handle 315*a* and the second handle 315*b* is to visually indicate that the two-pole circuit interrupter 200 has Tripped (opened) due to a cause other than manual operation of a handle. The handle position will be "vertical" thus indicating that a "Trip" condition has occurred. A trip condition in this case would be any expected reason that the two-pole circuit interrupter 200** would trip.

Figure 4:
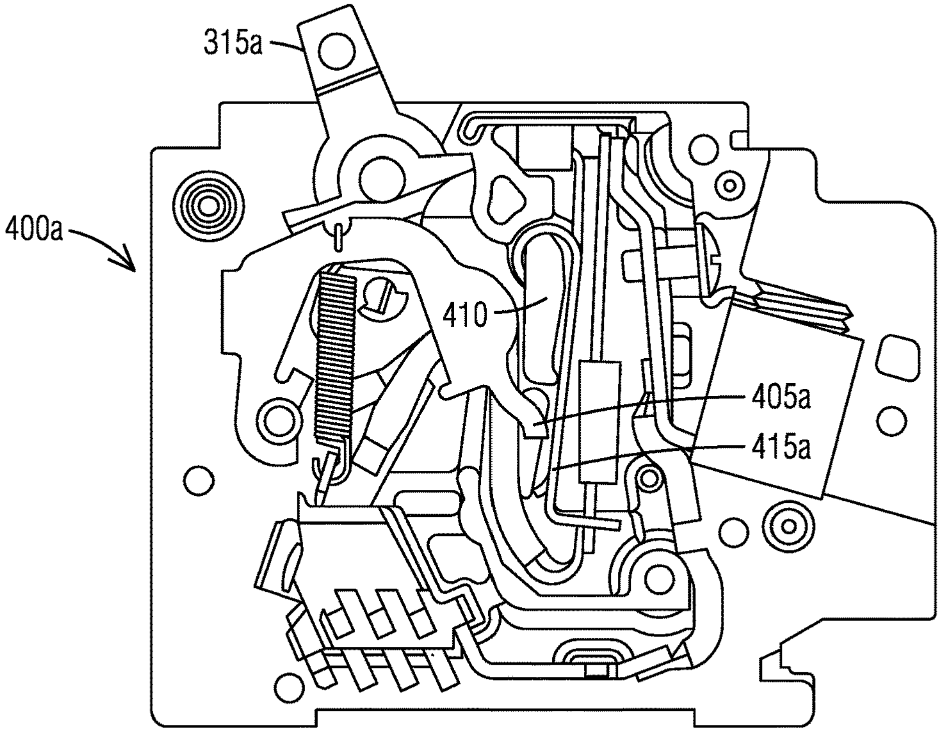
FIG. 4 illustrates an isometric view of a right outer mechanical pole cover of a two-pole circuit interrupter with the first cradle shown in an ON or LATCHED position in accordance with one illustrative embodiment of the present invention.

FIG. 4 illustrates an isometric view of a right outer mechanical pole cover **400*a* of the two-pole circuit interrupter 200 with a first cradle 405*a* shown in an ON or LATCHED position in accordance with one illustrative embodiment of the present invention. The first handle 315*a* of the first pole circuit interrupter 310*a* is also shown. The two-pole circuit interrupter 200 includes a trip bar 410 and a first trip arm 415*a*. The function of the first trip arm 415*a* is to rotate away from the first cradle 405*a* thus allowing the first cradle 405*a* to "unlatch" which will cause a circuit breaker pole of the two-pole circuit interrupter 200 to trip. A trip condition in this case would be any expected reason that the two-pole circuit interrupter 200** would trip.

A first function of the trip bar 410 is to trip both poles of the two-pole circuit interrupter 200 at the same time. In the case of an "electronic" tripping condition (where circuitry has determined that an arc fault and/or ground fault exists), a solenoid will actuate thus rotating the trip bar 410 against both trip arms thus tripping both poles of the two-pole circuit interrupter 200.

A second function of the trip bar 410 is to trip a second pole of the two-pole circuit interrupter 200 when a first pole of the two-pole circuit interrupter 200 has tripped. This is usually the case when an over current condition exists. In this case, the first trip arm **415*a* will rotate either by magnetic pull or from another part such as a Bimetal pulling it until the first cradle 405*a* unlatches thus tripping the first pole. As the first cradle 405*a* moves to the unlatched position, a feature on the first cradle 405*a* will push the trip bar 410 thus rotating it toward the trip position. Due to this rotation, the trip bar 410** will push a second trip arm to the tripped position thus allowing a second cradle to move to the unlatched position.

In this way, an electronic circuitry is used as a back-up means of tripping a second pole of the two-pole circuit interrupter 200 in a case where the first pole trips but the second pole fails to trip. If the electronic circuitry senses that one pole is tripped and the other pole is not, then a solenoid will actuate as stated above.

Figure 5:
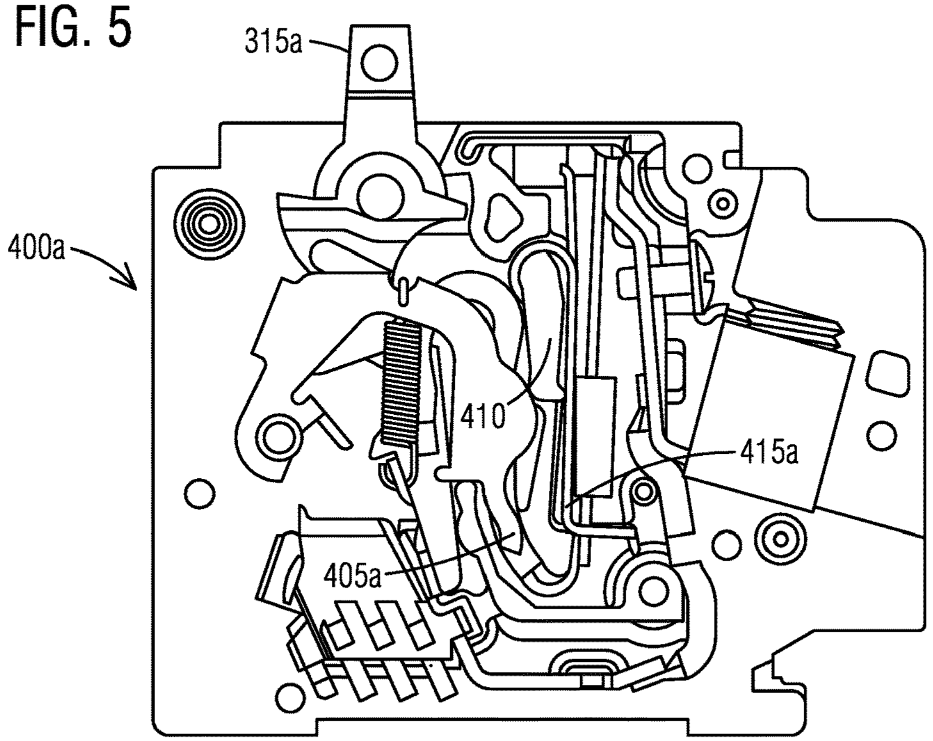
FIG. 5 illustrates an isometric view of a right outer mechanical pole cover of a two-pole circuit interrupter with the first cradle shown in a TRIPPED or UNLATCHED position in accordance with one illustrative embodiment of the present invention.
Figure 6:
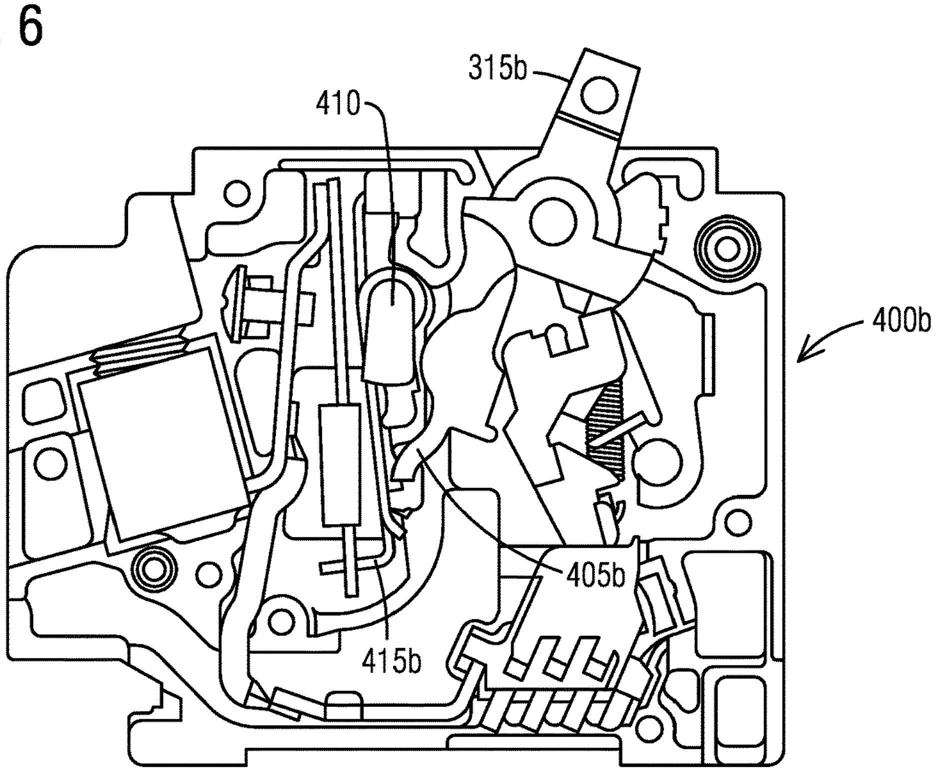
FIG. 6 illustrates an isometric view of a left outer mechanical pole cover of a two-pole circuit interrupter with the second cradle shown in an ON or LATCHED position in accordance with one illustrative embodiment of the present invention.

As seen in FIG. 5, it illustrates an isometric view of the right outer mechanical pole cover 400 of the two-pole circuit interrupter 200 with the first cradle 405*a* shown in a TRIPPED or UNLATCHED position in accordance with one illustrative embodiment of the present invention. As shown in FIG. 6, it illustrates an isometric view of a left outer mechanical pole 400*b* cover of the two-pole circuit interrupter 200 with a second cradle 405*b* shown in an ON or LATCHED position in accordance with one illustrative embodiment of the present invention. The second handle 315*b* of the second pole circuit interrupter 310*b* is also shown. The two-pole circuit interrupter 200 includes the trip bar 410 and a second trip arm 415*b*.

Figure 7:
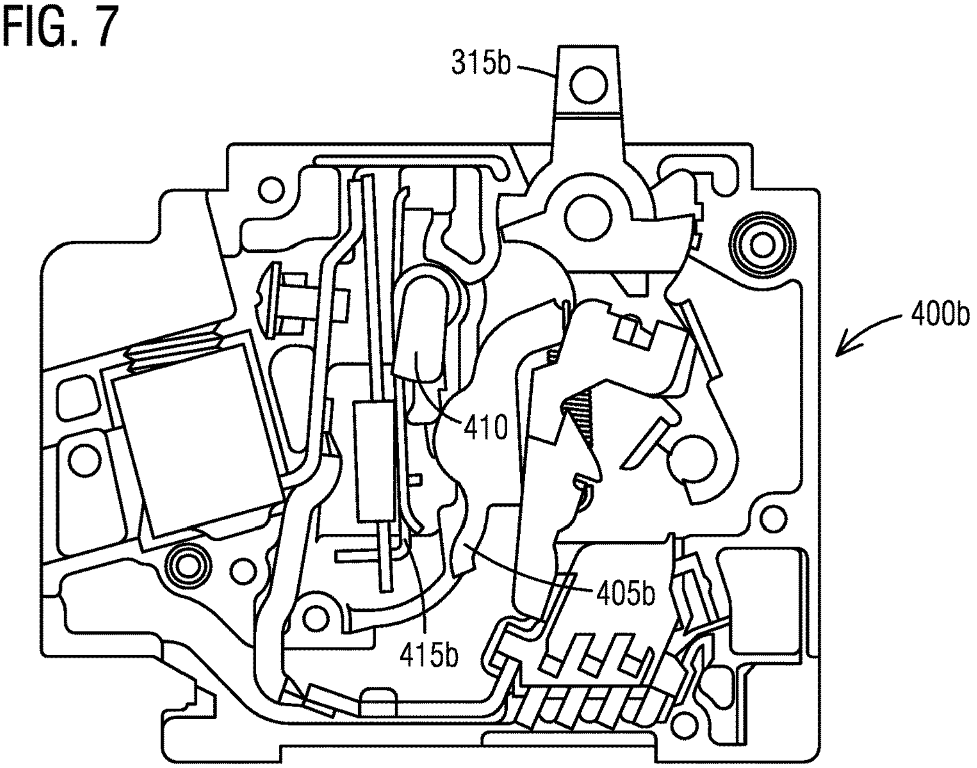
FIG. 7 illustrates an isometric view of a left outer mechanical pole cover of a two-pole circuit interrupter with the second cradle shown in a TRIPPED or UNLATCHED position in accordance with one illustrative embodiment of the present invention.
Figure 8:
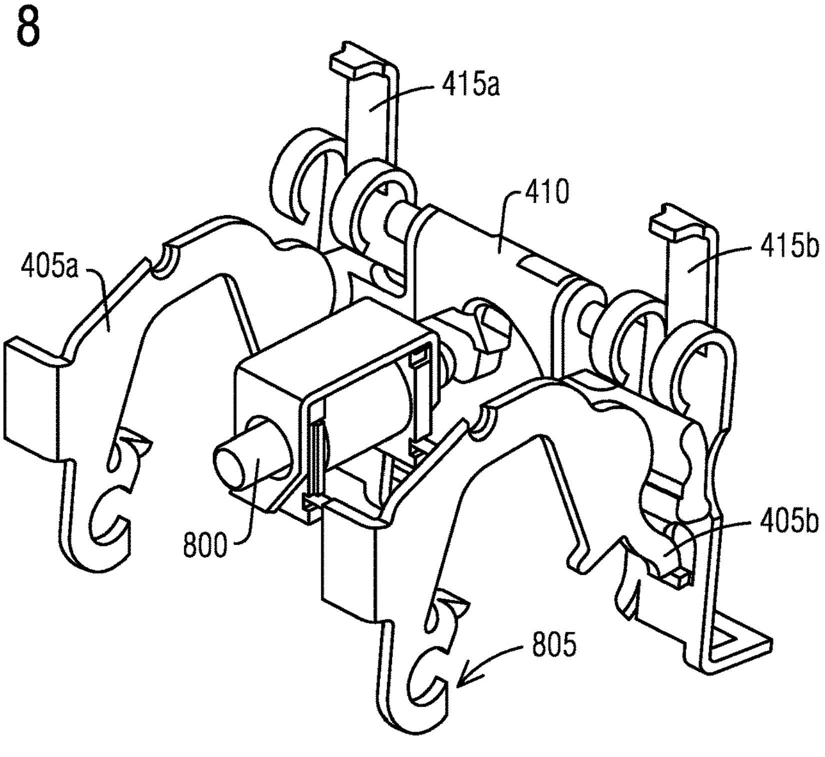
FIG. 8 illustrates an isometric view of first and second trip arms, a trip bar, first and second cradles and a solenoid assembly of a two-pole circuit interrupter with the first and second cradles shown in an ON or LATCHED position in accordance with one illustrative embodiment of the present invention.

In FIG. 7, it illustrates an isometric view of the left outer mechanical pole cover 400*b* of the two-pole circuit interrupter 200 with the second cradle 405*b* shown in a TRIPPED or UNLATCHED position in accordance with one illustrative embodiment of the present invention. With regard to FIG. 8, it illustrates an isometric view of the first and second trip arms 415*a*, 415*b*, the trip bar 410, the first and second cradles 405*a*, 405*b* and a solenoid assembly 800 of the two-pole circuit interrupter 200 with the first and second cradles 405*a*, 405*b* shown in an ON or LATCHED position 805 in accordance with one illustrative embodiment of the present invention.

Figure 9:
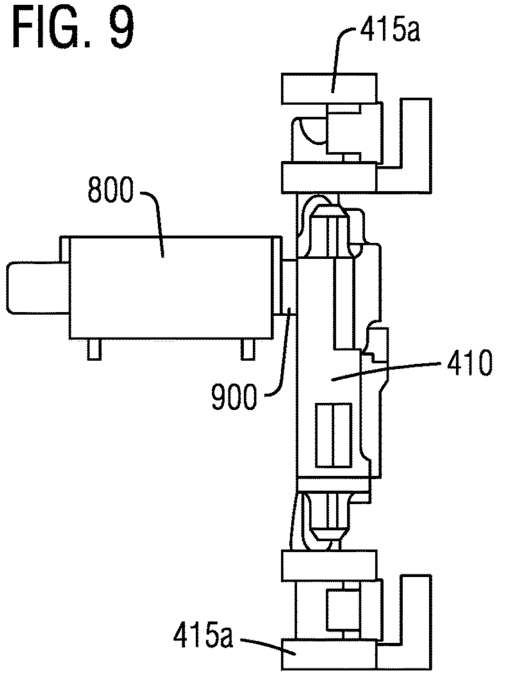
FIG. 9 illustrates a top view of first and second trip arms, a trip bar and a solenoid assembly of a two-pole circuit interrupter in accordance with one illustrative embodiment of the present invention.
Figure 10:
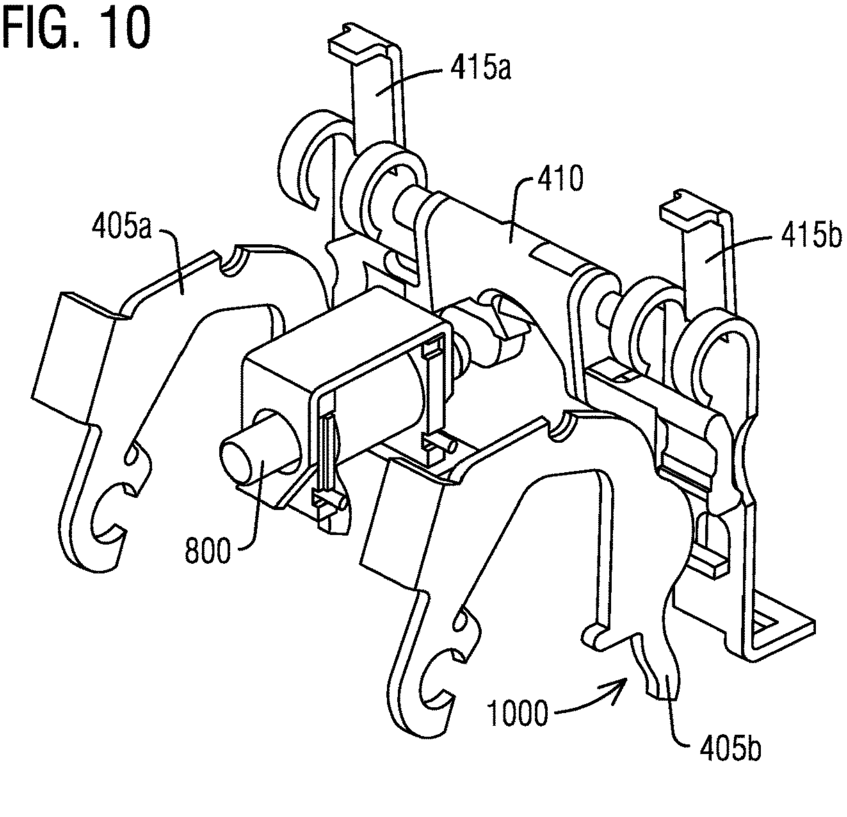
FIG. 10 illustrates an isometric view of first and second trip arms, a trip bar, first and second cradles and a solenoid assembly of a two-pole circuit interrupter with the first and second cradles shown in a TRIPPED or UNLATCHED position in accordance with one illustrative embodiment of the present invention.

With respect to FIG. 9, it illustrates a top view of the first and second trip arms 415*a*, 415*b*, the trip bar 410, and the solenoid assembly 800 of the two-pole circuit interrupter 200 in accordance with one illustrative embodiment of the present invention. When a solenoid 900 of the solenoid assembly 800 extends, the trip bar 410 rotates, tripping both poles of the two-pole circuit interrupter 200. FIG. 10 illustrates an isometric view of the first and second trip arms 415*a*, 415*b*, the trip bar 410, the first and second cradles 405*a*, 405*b* and the solenoid assembly 800 of the two-pole circuit interrupter 200 in accordance with one illustrative embodiment of the present invention. The first and second cradles 405*a*, 405*b* are shown in a TRIPPED or UNLATCHED position 1000.

Figure 11:
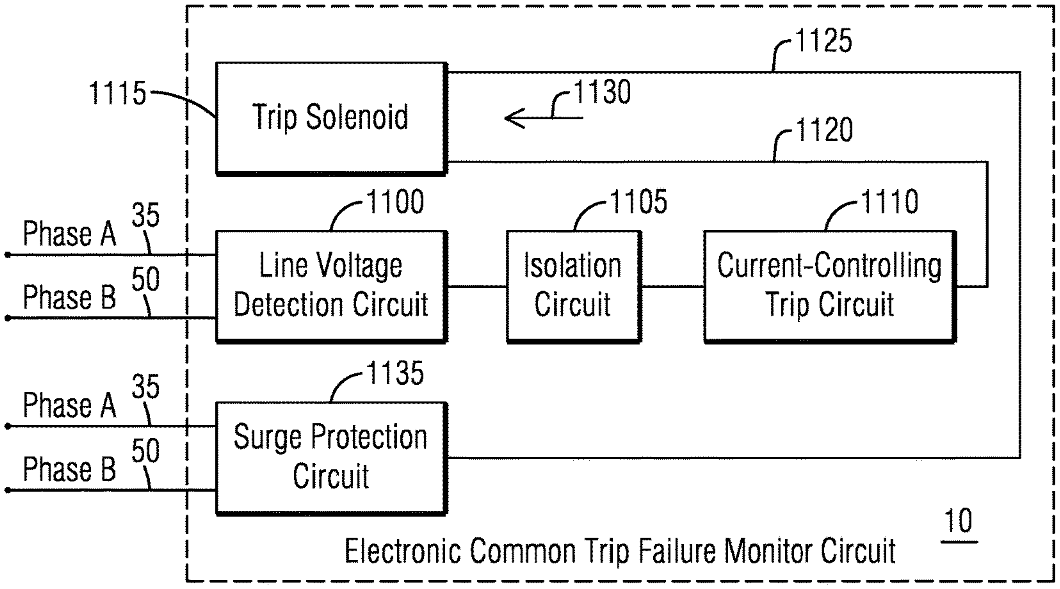
FIG. 11 illustrates a schematic diagram of an electronic solid-state common trip failure monitor circuit of the two-pole circuit interrupter shown in FIG. 1 in accordance with one illustrative embodiment of the present invention.

FIG. 11 illustrates a schematic diagram of the electronic solid-state common trip failure monitor circuit 10 of the two-pole circuit interrupter 5 shown in FIG. 1 in accordance with one illustrative embodiment of the present invention. The electronic solid-state common trip failure monitor circuit 10 includes a line voltage detection circuit 1100 disposed on a load side of the first switch 25 and the second switch 40 (see FIG. 1). The line voltage detection circuit 1100 is configured to detect a change in a voltage level of the first pole 30 on the phase A conductor 35 and a change in a voltage level of the second pole 45 on the phase B conductor 50 (see FIG. 1). The line voltage detection circuit 1100 provides an output voltage based on the voltage level of the first pole 30 on the phase A conductor 35 and the voltage level of the second pole 45 on the phase B conductor 50.

The electronic solid-state common trip failure monitor circuit 10 further includes an isolation circuit 1105 coupled between the line voltage detection circuit 1100 and a current-controlling trip circuit 1110 to isolate the line voltage detection circuit 1100 from the current-controlling trip circuit 1110. The electronic solid-state common trip failure monitor circuit 10 further comprises a trip solenoid 1115 disposed adjacent to the first switch 25 and the second switch 40. The trip solenoid 1115 has a first terminal 1120 and a second terminal 1125. The current-controlling trip circuit 1110 may be coupled to the first terminal 1120 of the trip solenoid 1115. The current-controlling trip circuit 1110 may provide a trip current 1130 to energize the trip solenoid 1115 to trip the energized pole among the first pole 30 and the second pole 45 (see FIG. 1).

The electronic solid-state common trip failure monitor circuit 10 may further include a surge protection circuit 1135 coupled to the phase A conductor 35, the phase B conductor 50 and the second terminal 1125 of the trip solenoid 1115. The surge protection circuit 1135 may protect the electronic solid-state common trip failure monitor circuit 10 from voltage spikes. The surge protection circuit 1135 may limit the voltage supplied to the electronic solid-state common trip failure monitor circuit 10 by either blocking or by shorting to ground any unwanted voltages above a safe threshold.

Figure 12:
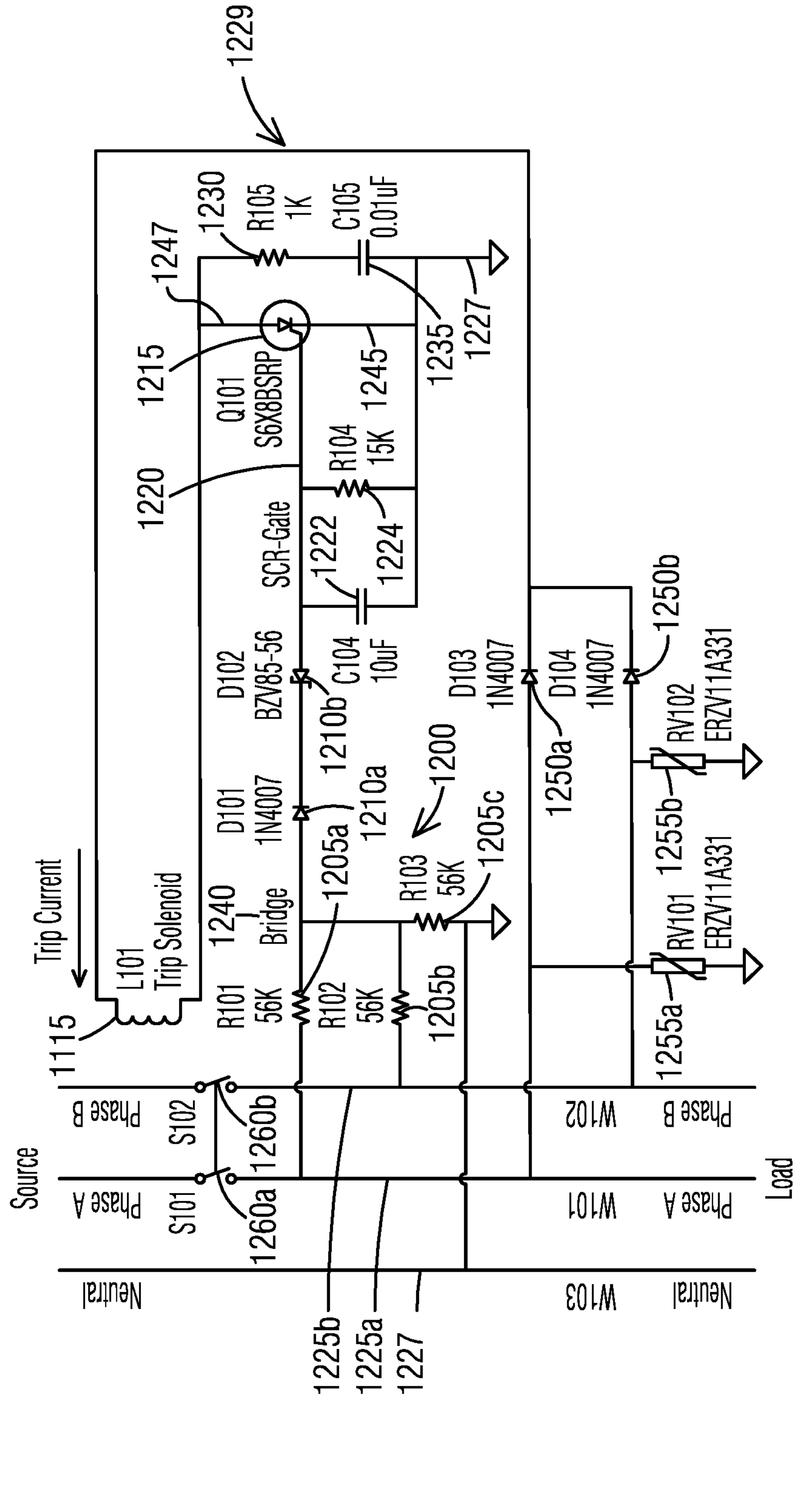
FIG. 12 illustrates a schematic diagram of details of the electronic solid-state common trip failure monitor circuit of the two-pole circuit interrupter shown in FIG. 11 in accordance with one illustrative embodiment of the present invention.

FIG. 12 illustrates a schematic diagram of details of the electronic solid-state common trip failure monitor circuit 10 of the two-pole circuit interrupter 5 shown in FIG. 11 in accordance with one illustrative embodiment of the present invention. The line voltage detection circuit 1100 is a resistor bridge 1200 which includes first, second, third resistors 1205*a*, 1205*b*, 1205*c* of equal resistance value in ohms. It would be understood by persons of ordinary skill in the art that other resistive bridges are also readily possible with different number of resistors and resistors with equal or non-equal values.

The isolation circuit 1105 may comprise a high voltage rectifier (D101) 1210*a* and a Zener diode (D102) 1210*b*. While the high voltage rectifier (D101) 1210*a* may be 1N4007 manufactured by several semiconductor manufacturers, the Zener diode (D102) 1210*b* may be BZV85-56 which is a standard 56 Volt Zener diode also manufactured by several semiconductor manufacturers.

The current-controlling trip circuit 1110 may comprise a silicon controlled rectifier (SCR Q101) 1215 having a SCR-Gate 1220. The SCR 1215 is triggered by a current going into the SCR-Gate 1220. The SCR (Q101) 1215 may be S6X8BSRP which is a 600V low gate current trigger Silicon Controlled Rectifier manufactured by Littlefuse. The current-controlling trip circuit 1110 may comprise a capacitor C104 1222 and a resistor R104 1224. The node "SCR-Gate" 1220 is electrically coupled to an electronics ground 1227 by both the capacitor C104 1222, e.g., a 10 microfarad capacitor, and resistor R104 1224, e.g., a 15 kilo-ohm resistor. The resistor R104 1224 provides a 0 Volt reference for the gate 1220 of the SCR (Q101) 1215, and a resistor divider for the resistor bridge. The capacitor C104 1222 provides filtering to prevent unwanted noise transients on a Phase A conductor 1225*a* and a Phase B conductor 1225*b* from turning on the SCR (Q101) 1215.

The current-controlling trip circuit 1110 may further comprise a "snubber" 1229 formed by a resistor R105 1230 (e.g., 1 kilo-ohm) and a capacitor C105 1235 (e.g., 0.01 microfarad) connected in series to the ground 1227. The "snubber" 1229 prevents unwanted fast rising voltage transients from turning on the SCR (Q101) 1215.

A node "Bridge" 1240 is electrically coupled to the gate of the SCR (Q101) 1215 labeled node "SCR-Gate" 1220 through diodes (D101) 1210*a* and (D102) 1210*b*. These diodes need only to supply up to 200 microamperes to turn on the SCR (Q101) 1215. A cathode 1245 of the SCR (Q101) 1215 is electrically coupled to the electronics ground 1227.

An anode 1247 of the SCR (Q101) 1215 is also electrically coupled to the electronics ground 1227 through the "snubber" 1229.

The diodes D103 1250*a* and D104 1250*b* may couple power to the trip solenoid. For example, the D103 1250*a* and D104 1250*b* can be 1N4007 which is a standard high voltage rectifier manufactured by several semiconductor manufacturers. The surge protection circuit 1135 may further comprise a first metal-oxide varistor (MOV RV101) 1255*a* and a second metal-oxide varistor (MOV RV102) 1255*b*. The first and second MOVs 1255*a*, 1255*b* protect against excessive transient voltages.

As protection devices the first and second MOVs 1255*a*, 1255*b* shunt the current created by the excessive voltage away from sensitive components when triggered. The Phase A conductor 1225*a* may be coupled to the electronics ground 1227 (neutral) through the first MOV 1255*a* and the Phase B conductor 1225*b* may be electrically coupled to the electronics ground 1227 (neutral) through the second MOV 1255*b* to prevent large surge voltages from exceeding the voltage rating of the SCR (Q101) 1215 and turning on.

In one embodiment shown in FIG. 12, two 120V AC poles, Phase A and Phase B, are monitored by the resistor bridge 1200 on a load side of first and second switches S101 1260*a* and S102 1260*b*. One pole is energized by the first switch S101 1260*b* which is labeled "Phase A," and the other pole is energized by the second switch S102 1260*a* which is labeled "Phase B". For example, these switches 1260*a*, 1260*b* are circuit breaker switches with current rating up to 60 A constant AC current, and circuit breaking rating of >10 kilo-amperes. The first switch S101 1260*b* is mechanically coupled to the second switch S102 1260*a* by a trip bar, and a handle mechanism for the first switch S101 1260*b* is mechanically coupled to a handle mechanism for the second switch S102 1260*a* by a handle tie or a tie bar.

In operation, the resistor bridge 1200 monitors the voltages at the Phase A conductor 1225*a* and the Phase B conductor 1225*b*. The resistor R101 1205*a* electrically couples the Phase A conductor 1225*a* to node "Bridge" 1240, and resistor R102 1205*b* electrically couples the Phase B conductor 1225*b* to node "Bridge" 1240. The resistor R103 1205*c* provides a 0 Volt potential reference to the resistor bridge 1200. The resistor R103 1205*c* electrically couples the node "Bridge" 1240 to the electronics ground 1227 which is electrically coupled to Neutral.

The Phase A conductor 1225*a* and the Phase B conductor 1225*b* are also coupled to the trip solenoid (L101) 1115 through the diodes D103 1250*a* and D104 1250*b* respectively. The opposite terminal of the trip solenoid (L101) 1115 is electrically coupled to the anode 1247 of the SCR (Q101) 1215.

The trip solenoid (L101) 1115 contains a cylindrical plunger made of an iron alloy. When a solenoid of the trip solenoid (L101) 1115 is energized, a magnetic force is applied to the plunger resulting in acceleration toward the trip bar, tripping both first and second switches S101 1260*a* and S102 1260*b* to the open state.

Figure 13:
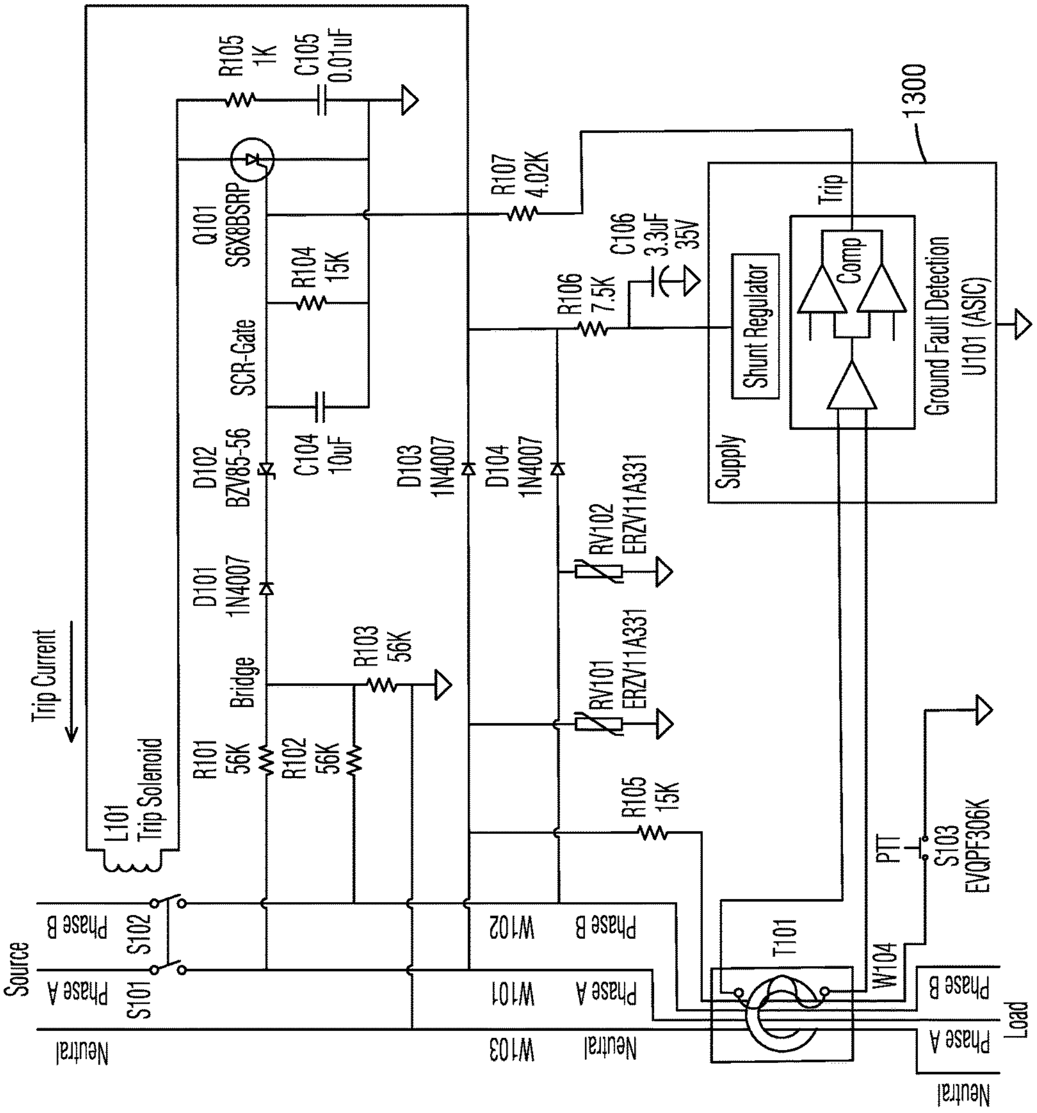
FIG. 13 illustrates a schematic diagram of details of the electronic solid-state common trip failure monitor circuit of the two-pole circuit interrupter shown in FIG. 11 with ground fault detection circuitry in accordance with one illustrative embodiment of the present invention.

Referring to FIG. 13, it describes another embodiment of the present invention where there exists a ground fault detection circuit in a circuit interrupter. In particular, FIG. 13 illustrates a schematic diagram of details of the electronic solid-state common trip failure monitor circuit 10 of the two-pole circuit interrupter 5 shown in FIG. 11 with ground fault detection circuitry 1300 in accordance with one illustrative embodiment of the present invention. However, the ground fault detection circuitry 1300 may be replaced by an arc fault detection circuit, or possibly a combination ground fault and arc fault detection circuit. Since the details and operation of the ground fault detection circuitry 1300 and an arc fault detection circuit are known in the art their description is not provided.

Figure 14A:
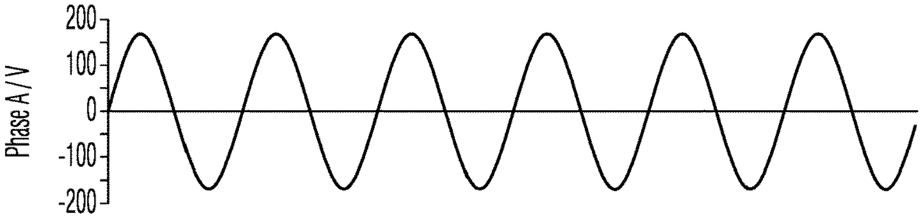
FIGS. 14A-14E illustrate graphs of various voltages and a trip current of the electronic solid-state common trip failure monitor circuit shown in FIG. 12 for a 240 VAC system for use with the two-pole circuit interrupter in accordance with one illustrative embodiment of the present invention.
Figure 14B:
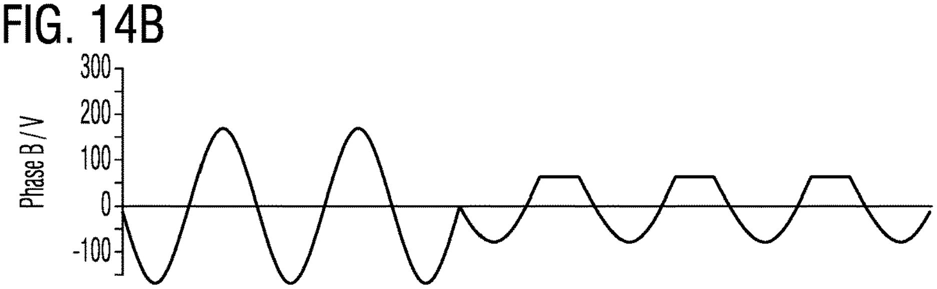
Figure 14C:
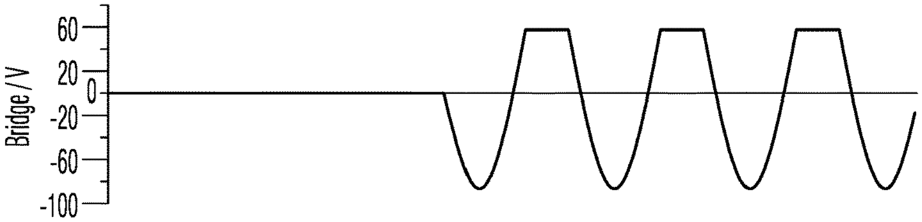
Figure 14D:
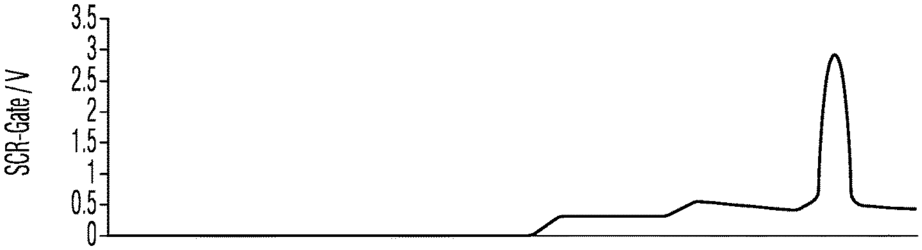
Figure 14E:
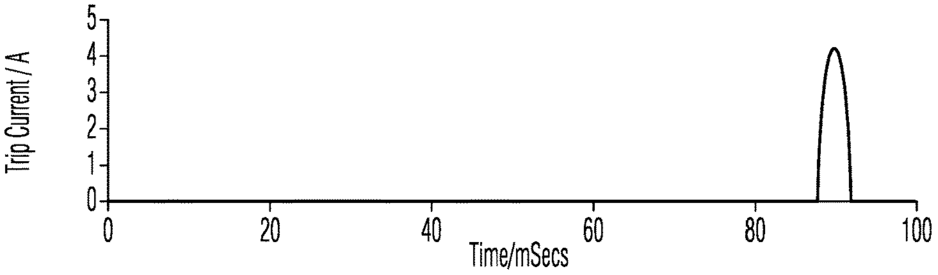

Turning now to FIGS. 14A-14E, they illustrate graphs of various voltages and a trip current of the electronic solid-state common trip failure monitor circuit 10 shown in FIG. 12 for a 240V AC system for use with the two-pole circuit interrupter 5 in accordance with one illustrative embodiment of the present invention. In particular, a case where Phase B is 180 degrees phase shifted from Phase A which is a 240V AC system is described in FIGS. 14A-14E. FIG. 14A shows a voltage (V) of Phase A on the Phase A conductor 1225*a* and FIG. 14B shows a voltage (V) of Phase B on the Phase B conductor 1225*b*. FIG. 14C shows an output voltage (V) of the resistive bridge 1200 at the node "Bridge" 1240. FIG. 14D shows a voltage (V) at the node "SCR-Gate" 1220 of the SCR (Q101) 1215. FIG. 14E shows a trip current (A) to the trip solenoid (L101) 1115.

While 120V AC is present on both Phase A and Phase B, the output voltage of the resistive bridge 1200 remains balanced. See FIG. 14C. For the case where Phase B is 180 degrees phase shifted from Phase A, the output voltage at node "Bridge" 1240 is actually 0V AC. The Zener diode (D102) 1210*b* is needed to provide isolation between the resistive bridge 1200 output node "Bridge" 1240 and node SCR-Gate 1220 to prevent any voltage less than 56 Volts on the node "Bridge" 1240 from coupling to the SCR (Q101) 1215 from turning ON and tripping the two-pole circuit interrupter 5 shown in FIG. 11. This is especially important for the case phase B is phase shifted 120 degrees from phase A. In the event where one pole is powered but the other pole is not powered, the resistive bridge 1200 becomes unbalanced and trips the two-pole circuit interrupter 5.

To demonstrate functioning of the two-pole circuit interrupter 5, Phase B is switched open at around 42 milliseconds in FIG. 14B. In FIG. 14C, the output voltage of the resistive bridge 1200 node "Bridge" 1240 becomes unbalanced and begins to charge capacitor C104 1222 (node SCR-Gate 1220) through diode D101 1210*a* and Zener diode D102 1210*b*. After about three cycles, in FIG. 14D, the voltage at node SCR-Gate 1220 reaches over 500 millivolts which is sufficient to supply enough gate current into the SCR (Q101) 1215 to trigger it to turn ON. As shown in FIG. 14E, the resulting "Trip Current" energizes the trip solenoid (L101) 1115 and trips the remaining energized pole of the two-pole circuit interrupter 5 thus preventing a hazardous condition of one pole being ON while the other pole being OFF.

Figure 15A:
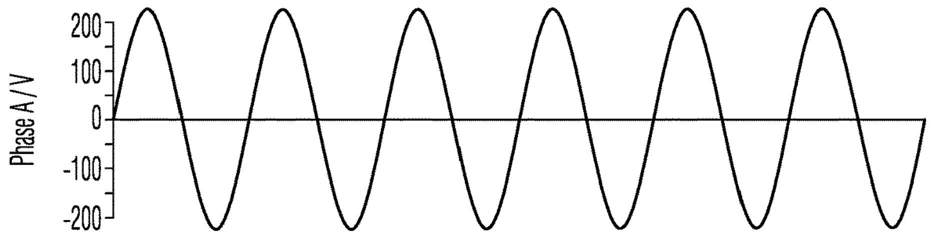
FIGS. 15A-15E illustrate graphs of various voltages and a trip current of the electronic solid-state common trip failure monitor circuit shown in FIG. 12 for a 208 VAC system for use with the two-pole circuit interrupter in accordance with one illustrative embodiment of the present invention.
Figure 15B:
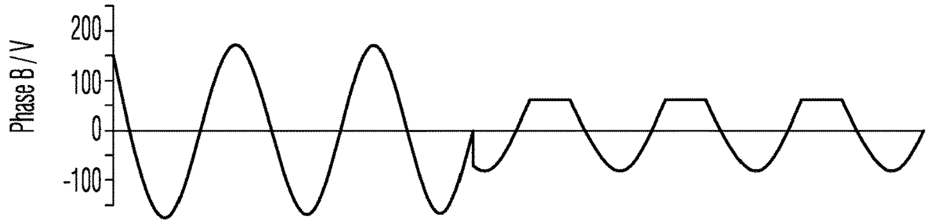
Figure 15C:
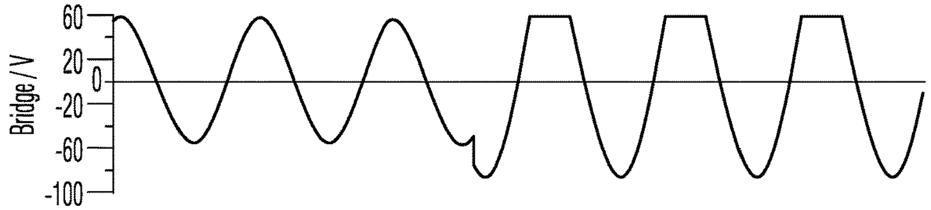
Figure 15D:
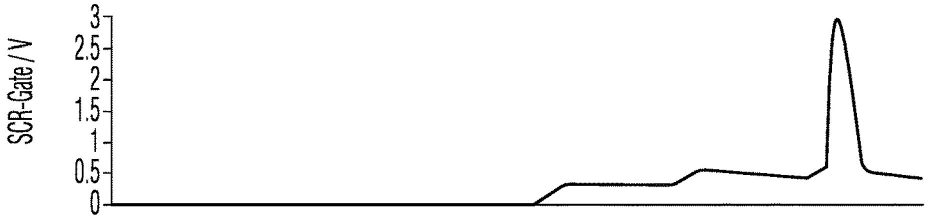
Figure 15E:
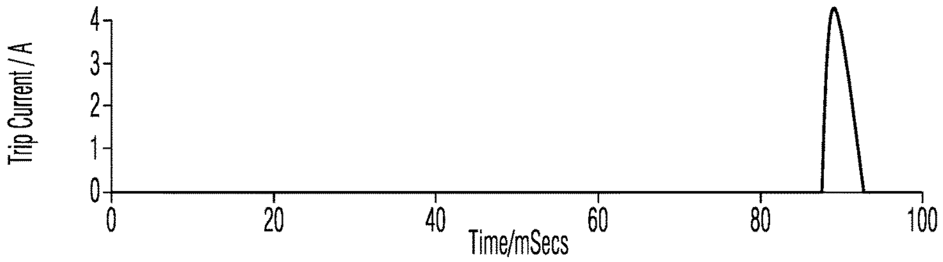

FIGS. 15A-15E illustrate graphs of various voltages and a trip current of the electronic solid-state common trip failure monitor circuit 10 shown in FIG. 12 for a 208 VAC system for use with the two-pole circuit interrupter 5 in accordance with one illustrative embodiment of the present invention. In particular, a case where Phase B is 120 degrees phase shifted from Phase A which is a 208V AC system is described in FIGS. 15A-15E. FIG. 15A shows a voltage (V) of Phase A on the Phase A conductor 1225*a* and FIG. 15B shows a voltage (V) of Phase B on the Phase B conductor 1225*b*. FIG. 15C shows an output voltage (V) of the resistive bridge 1200 at the node "Bridge" 1240. FIG. 15D shows a voltage (V) at the node "SCR-Gate" 1220 of the SCR (Q101) 1215. FIG. 15E shows a trip current (A) to the trip solenoid (L101) 1115.

To demonstrate functioning of the two-pole circuit interrupter 5, Phase B is switched open at around 44 milliseconds in FIG. 15B. In FIG. 15C, the output voltage of the resistive bridge 1200 node "Bridge" 1240 becomes unbalanced and begins to charge capacitor C104 1222 (node SCR-Gate 1220) through diode D101 1210*a* and Zener diode D102 1210*b*. After about three cycles, in FIG. 15D, the voltage at node SCR-Gate 1220 reaches over 500 millivolts which is sufficient to supply enough gate current into the SCR (Q101) 1215 to trigger it to turn ON. As shown in FIG. 15E, the resulting "Trip Current" energizes the trip solenoid (L101) 1115 and trips the remaining energized pole of the two-pole circuit interrupter 5 thus preventing a hazardous condition of one pole being ON while the other pole being OFF.

Figure 16:
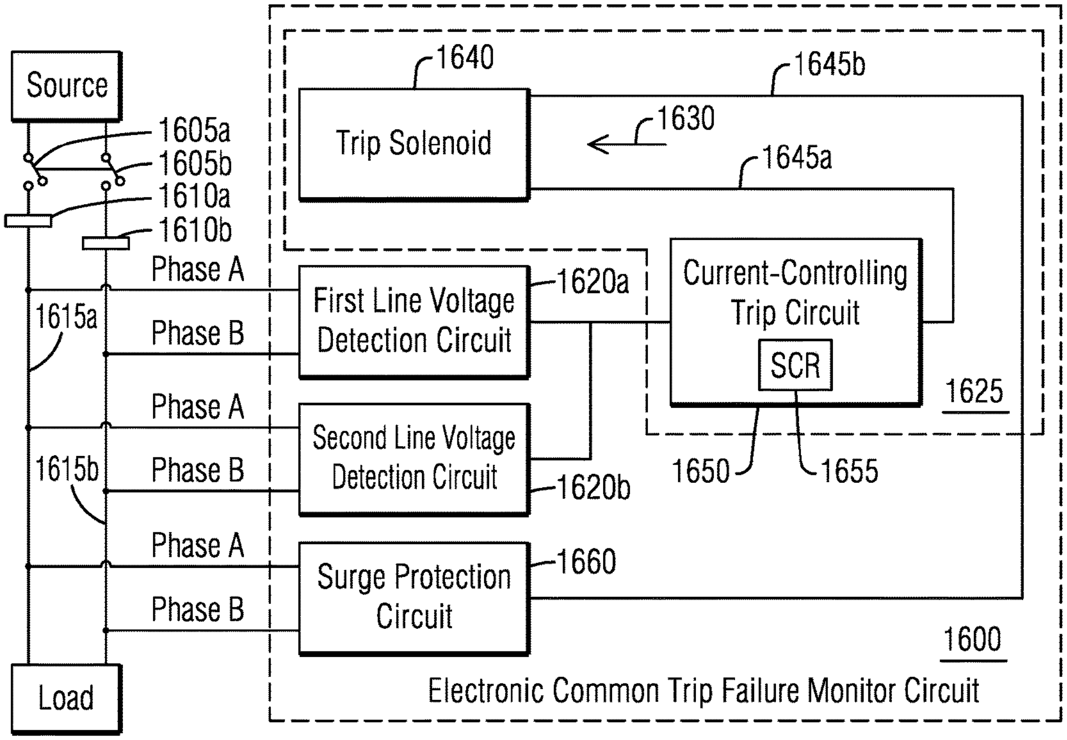
FIG. 16 illustrates a schematic diagram of an electronic solid-state common trip failure monitor circuit of the two-pole circuit interrupter shown in FIG. 1 in accordance with another illustrative embodiment of the present invention.

FIG. 16 illustrates a schematic diagram of an electronic solid-state common trip failure monitor circuit 1600 of the two-pole circuit interrupter 5 shown in FIG. 1 in accordance with another illustrative embodiment of the present invention. The two-pole circuit interrupter 5 comprises a first switch 1605*a* to energize a first pole 1610*a* on a phase A conductor 1615*a* of the two-pole circuit interrupter 5. The two-pole circuit interrupter 5 further comprises a second switch 1605*b* to energize a second pole 1610*b* on a phase B conductor 1615*b* of the two-pole circuit interrupter 5.

In one embodiment, the electronic solid-state common trip failure monitor circuit 1600 includes a first line voltage detection circuit 1620*a* disposed on a load side of the first switch 1605*a* and the second switch 1605*b*. The first line voltage detection circuit 1620*a* is configured to detect a change in a voltage level of the phase A conductor 1615*a*. The electronic solid-state common trip failure monitor circuit 1600 includes a second line voltage detection circuit 1620*b* disposed on a load side of the first switch 1605*a* and the second switch 1605*b*, the second line voltage detection circuit 1620*b* is configured to detect a change in a voltage level of the phase B conductor 1615*b*.

The electronic solid-state common trip failure monitor circuit 1600 further includes a trip circuit 1625 configured to control a current 1630 to trip an energized pole among the first pole 1610*a* and the second pole 1610*b* if only one of the first pole 1610*a* and the second pole 1610*b* is energized when a user controls a tie bar to turn ON or turn OFF the two-pole circuit interrupter 5 or when a trip bar fails to trip one of the first pole 1610*a* and the second pole 1610*b*. The trip circuit 1625 further comprises a trip solenoid 1640 disposed adjacent to the first switch 1605*a* and the second switch 1605*b*. The trip solenoid 1640 has a first terminal 1645*a* and a second terminal 1645*b*.

The trip circuit 1625 further comprises a current-controlling circuit 1650 coupled to the first terminal 1645*a* of the trip solenoid 1640. The current-controlling circuit 1650 to provide the trip current 1630 to energize the trip solenoid 1640 to trip the energized pole among the first pole 1610*a* and the second pole 1610*b*.

In one embodiment, the current-controlling circuit 1650 includes a silicon controlled rectifier (SCR) 1655 having a gate. The SCR 1655 is triggered by a current going into the gate. The electronic solid-state common trip failure monitor circuit 1600 further includes a surge protection circuit 1660 coupled to the phase A conductor 1615*a*, the phase B conductor 1615*b* and the second terminal 1645*b* of the trip solenoid 1640.

Figure 17:
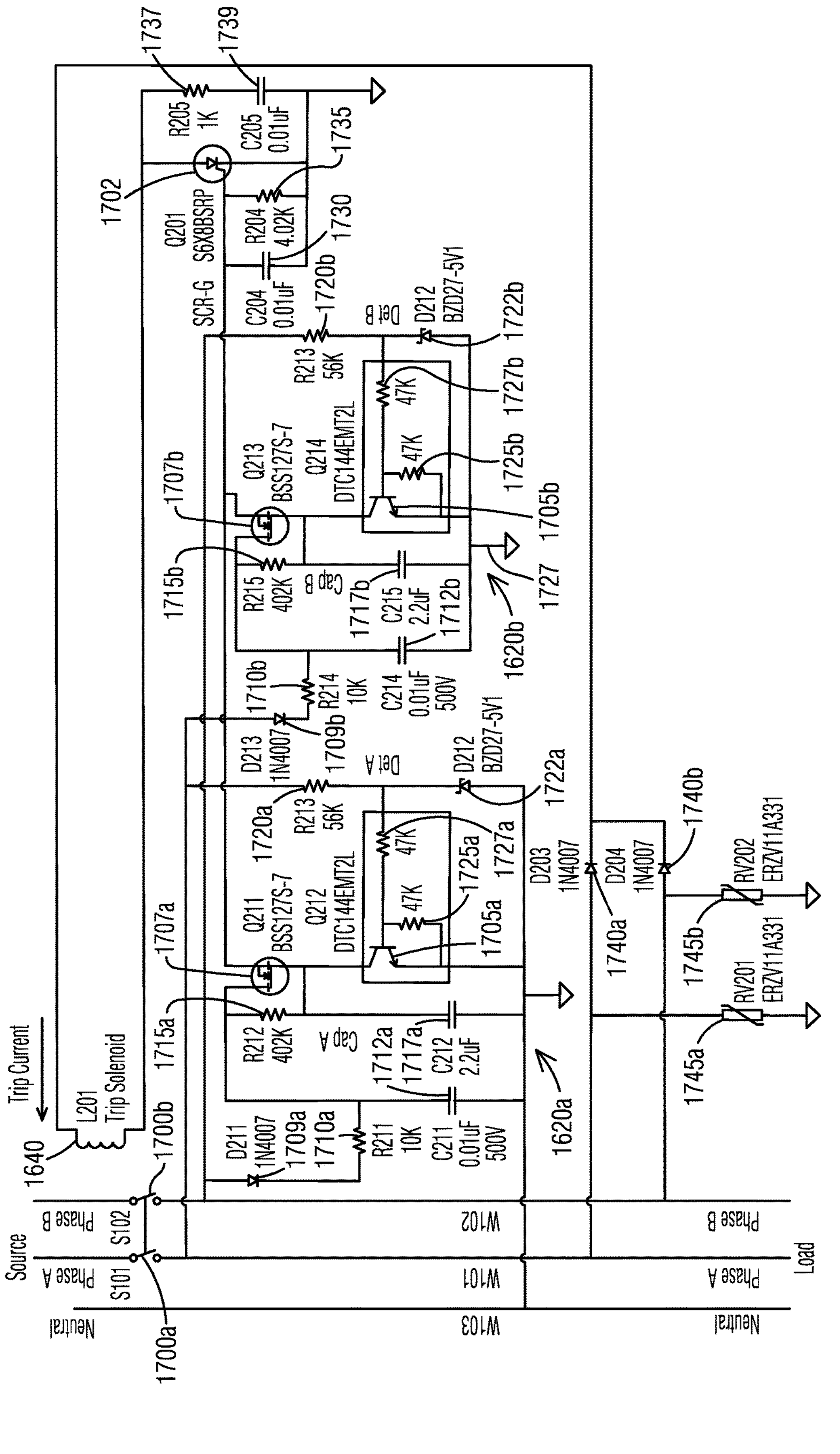
FIG. 17 illustrates a schematic diagram of details of the electronic solid-state common trip failure monitor circuit of the two-pole circuit interrupter shown in FIG. 16 in accordance with one illustrative embodiment of the present invention.

FIG. 17 illustrates a schematic diagram of details of the electronic solid-state common trip failure monitor circuit 1600 of the two-pole circuit interrupter 5 shown in FIG. 16 in accordance with one illustrative embodiment of the present invention. In an alternative third embodiment shown in FIG. 17, the two 120V AC poles, Phase A and Phase B, are monitored by two independent line voltage detection circuits, one for each phase, on the load side of first and second switches S201 1700*a* and S202 1700*b*. One pole is energized by the first switch S201 1700*a* which is labeled "Ph A", and the other pole is energized by the second switch S202 1700*b* which is labeled "Ph B". These circuit breaker switches have current rating up to 60 A constant AC current, and circuit breaking rating of >10 kilo-amperes. The first switch S201 1700*a* is mechanically coupled to the second switch S202 1700*b* by a trip bar. A handle mechanism for the first switch S201 1700*a* is mechanically coupled to a handle mechanism for the second switch S202 1700*b* by a handle tie or a tie bar.

The electronic solid-state common trip failure monitor circuit 1600 comprises a SCR (Q201) 1702, the first line voltage detection circuit 1620*a* and the second line voltage detection circuit 1620*b*. The first line voltage detection circuit 1620*a* also comprises a Bipolar switching transistor Q212 1705*a* which may be a part number DTC144EMT2L manufactured by Rohm. The first line voltage detection circuit 1620*a* further comprises a MOSFET switching transistor Q211 1707*a* which may be a part number BSS127S manufactured by Diodes, Inc. The first line voltage detection circuit 1620*a* further comprises a circuit formed by a diode D211 1709*a*, a resistor R211 1710*a* (e.g., 10K), a capacitor C211 1712*a* (e.g., 0.01 uF), a resistor R212 1715*a* (e.g., 402K), a capacitor C212 1717*a* (e.g., 2.2 uF), and the MOSFET Q211 1707*a* also supplies current to a gate of the SCR (Q201) 1702 except from Phase B instead of Phase A. The first line voltage detection circuit 1620*a* further comprises a resistor R213 1720*a* (e.g., 56K), a Zener diode D212 1722*a*, a first resistor 1725*a* (e.g., 47K) and a second resistor 1727*a* (e.g., 47K) coupled to the Bipolar switching transistor Q212 1705*a*.

The second line voltage detection circuit 1620*b* comprises a Bipolar switching transistor Q214 1705*b* which may be a part number DTC144EMT2L manufactured by Rohm. The second line voltage detection circuit 1620*b* also comprises a MOSFET switching transistor Q213 1707*b* which may be a part number BSS127S manufactured by Diodes, Inc. The second line voltage detection circuit 1620*b* further comprises a circuit formed by a diode D213 1709*b*, a resistor R214 1710*b* (e.g., 10K), a capacitor C214 1712*b* (e.g., 0.01 uF), a resistor R215 1715*b* (e.g., 402K), a capacitor C215 1717*b* (e.g., 2.2 uF), and the MOSFET Q213 1707*b* also supplies current to a gate of the SCR (Q201) 1702 except from Phase A instead of Phase B. The second line voltage detection circuit 1620*b* further comprises a resistor R216 1720*b* (e.g., 56K), a Zener diode D214 1722*b*, a first resistor 1725*b* (e.g., 47K) and a second resistor 1727*b* (e.g., 47K) coupled to the Bipolar switching transistor Q214 1705*b*.

Diodes D211 1709*a* and D213 1709*b* are a 1N4007 which is a standard high voltage rectifier manufactured by several semiconductor manufacturers. Diodes D212 1722*a* and D214 1722*b* have part number BDZ27-5V1 and are standard 5.1 Volt Zener diodes manufactured by many manufacturers. The Bipolar switching transistors Q212 1705*a*, Q214 1705*b* have internal 47 kilo-ohm resistor dividers on the input into the bases of the npn bipolar transistors. In other words, the input pin is electrically coupled to the base of the transistor, and the base is electrically coupled to the emitter through another 47 kilo-ohm.

The current-controlling circuit 1650 comprises the SCR (Q201) 1702, a capacitor C204 1730 (e.g., 0.01 uF), a resistor R204 1735 (e.g., 4.02K), a resistor R205 1737 (e.g., 1K) and a capacitor C205 1739 (e.g., 0.01 uF). The current-controlling circuit 1650 is coupled to the trip solenoid 1640. A first diode D203 1740*a* (e.g., part no. 1N4007) and a second diode D204 1740*b* (e.g., part no. 1N4007) couple power to the trip solenoid 1640. Both diodes are grounded via its own MOV. In particular, the first diode D203 1740*a* is connected to the Neutral 1227 using a first MOV RV201 1745*a* (e.g., part no. ERZV11A331) and the second diode D204 1740*b* is connected to the Neutral 1227 using a second MOV RV202 1745*b* (e.g., part no. ERZV11A331) to protect against excessive transient voltages.

In operation, the circuit formed by the resistor R213 1720*a*, the Zener diode D212 1722*a*, and the Bipolar switching transistor Q212 1705*a* detects the presence of 120V AC on node "Ph A," while the circuit formed by the resistor R216 1720*b*, the Zener diode D214 1722*b*, and the Bipolar switching transistor Q214 1705*b* detects the presence of 120V AC on node "Ph B." These detector circuits are specifically described as follows. Node "Ph A" is electrically coupled to the cathode of the Zener diode (D212) 1722*a* and to the input pin of the Bipolar switching transistor Q212 1705*a* through a current limiting 56 kilo-ohm resistor (R213) 1720*a*. This node is labeled "Det A". The anode of the Zener diode (D212) 1722*a* and the emitter pin of the Bipolar switching transistor Q212 1705*a* are electrically coupled to electronics ground 1227 which is electrically coupled to node "Neutral".

Likewise, node "Ph B" is electrically coupled to the cathode of the Zener diode (D214) 1705*b* and to the input pin of the Bipolar switching transistor Q214 1705*b* through a current limiting 56 kilo-ohm resistor (R216) 1720*b*. This node is labeled "Det B". The anode of the Zener diode (D214) 1705*b* and the emitter pin of the Bipolar switching transistor Q214 1705*b* are electrically coupled to electronics ground 1227 which is electrically coupled to node "Neutral".

In operation, the circuit formed by diode D213 1709*b*, resistor R214 1710*b*, capacitor C214 1712*b*, resistor R215 1715*b*, capacitor C215 1717*b*, and MOSFET Q213 1707*b* supplies current to the gate of the SCR (Q201) 1702 from Phase A. The circuit formed by diode D211 1709*a*, resistor R211 1710*a*, capacitor C211 1712*a*, resistor R212 1715*a*, capacitor C212 1717*a*, and MOSFET Q211 1707*a* also supplies current to the gate of the SCR (Q201) 1702 except from Phase B instead of Phase A. These current supply circuits are specifically described as follows. Node "Ph A" is electrically coupled to the anode of rectifying diode D213 1709*b*. The cathode of D213 1709*b* is electrically coupled to the drain of MOSFET switching transistor Q213 1707*b* through a current limiting 10 kilo-ohm resistor R214 1710*b*. The source of MOSFET switching transistor Q213 is electrically coupled to the gate of SCR Q201 1702 labeled node "SCR-G". The drain of MOSFET Q213 1707*b* is electrically coupled to the electronics ground 1227 through a high voltage (500V) filter capacitor C214 1712*b*. The electronics ground 1227 is electrically coupled to "Neutral". The drain of MOSFET Q213 1707*b* also is electrically coupled to the gate of MOSFET Q213 1707*b* through a 402 kilo-ohm bias resistor R215 1715*b*. The gate of MOSFET Q213 1707*b* is electrically coupled to electronics ground through a 2.2 microfarad charging capacitor C215 1717*b* to the electronics ground 1227 which is electrically coupled to "Neutral". The gate of MOSFET Q213 1707*b* also is electrically coupled to the collector of the Bipolar switching transistor Q214 1705*b* of the circuit that detects the presence of Phase B.

Likewise, Node "Ph B" is electrically coupled to the anode of rectifying diode D211 1709*a*. The cathode of D211 1709*a* is electrically coupled to the drain of MOSFET switching transistor Q211 1707*a* through a current limiting 10 kilo-ohm resistor R211 1710*a*. The source of MOSFET switching transistor Q211 1707*a* is electrically coupled to the gate of SCR Q201 1702 labeled node "SCR-G". The drain of MOSFET Q211 1707*a* is electrically coupled to the electronics ground 1227 through a high voltage (500V) filter capacitor C211 1712*a*. The electronics ground 1227 is electrically coupled to "Neutral". The drain of MOSFET Q211 1707*a* also is electrically coupled to the gate of MOSFET Q211 1707*a* through a 402 kilo-ohm bias resistor R212 1715*a*. The gate of MOSFET Q211 1707*a* is electrically coupled to electronics ground through a 2.2 microfarad charging capacitor C212 1717*a* to the electronics ground 1227 which is electrically coupled to "Neutral". The gate of MOSFET Q211 1707*a* also is electrically coupled to the collector of the Bipolar switching transistor Q212 1705*a* of the circuit that detects the presence of Phase A.

Consistent with one exemplary embodiment, the SCR (Q201) 1702 is S6X8BSRP which is a 600V low gate current trigger Silicon Controlled Rectifier manufacturer by Littlefuse that only requires up to 200 microamperes of gate current to turn on the SCR (Q201) 1702. Node "SCR-G" is electrically coupled to the electronics ground 1227 by both the C204 1730, a 0.01 microfarad capacitor, and the R204 1735, a 4.02 kilo-ohm resistor. R204 1735 provides a 0 Volt reference for the gate of the SCR Q201 1702. C204 1730 provides filtering to prevent unwanted noise transients on Phase A and Phase B from turning on the SCR (Q201) 1702.

The "Ph A" and "Ph B" are also coupled to the trip solenoid L201 1640 through diodes D203 1740*a* and D204 1740*b* respectively. Diodes D203 1740*a* and D204 1740*b* also are a 1N4007 which is a standard high voltage rectifier manufactured by several semiconductor manufacturers. The trip solenoid L201 1640 is a cylindrical plunger made of an iron alloy.

When the trip solenoid L201 1640 is energized, a magnetic force is applied to the plunger resulting in acceleration toward the trip bar, tripping both switches S201 and S202 to the open state. The opposite terminal of the trip solenoid L201 1640 is electrically coupled to the anode of the SCR (Q201) 1702. The cathode of the SCR (Q201) 1702 is electrically coupled to the electronics ground 1227.

The anode of the SCR (Q201) 1702 is electrically coupled to the ground 1227 through a "snubber" formed by a 1 kilo-ohm resistor R205 1737 and a 0.01 microfarad capacitor C205 1739 connected in series to the ground 1227. The "snubber" prevents unwanted fast rising voltage transients from turning on the SCR (Q201) 1702. Also, "Ph A" is electrically coupled to the electronics ground 1227 (Neutral) through MOV RV201, and "Ph B" is electrically coupled to the electronics ground 1227 (Neutral) through MOV RV202 to prevent large surge voltages from exceeding the voltage rating of the SCR (Q201) 1702 and turning ON.

Figure 18:
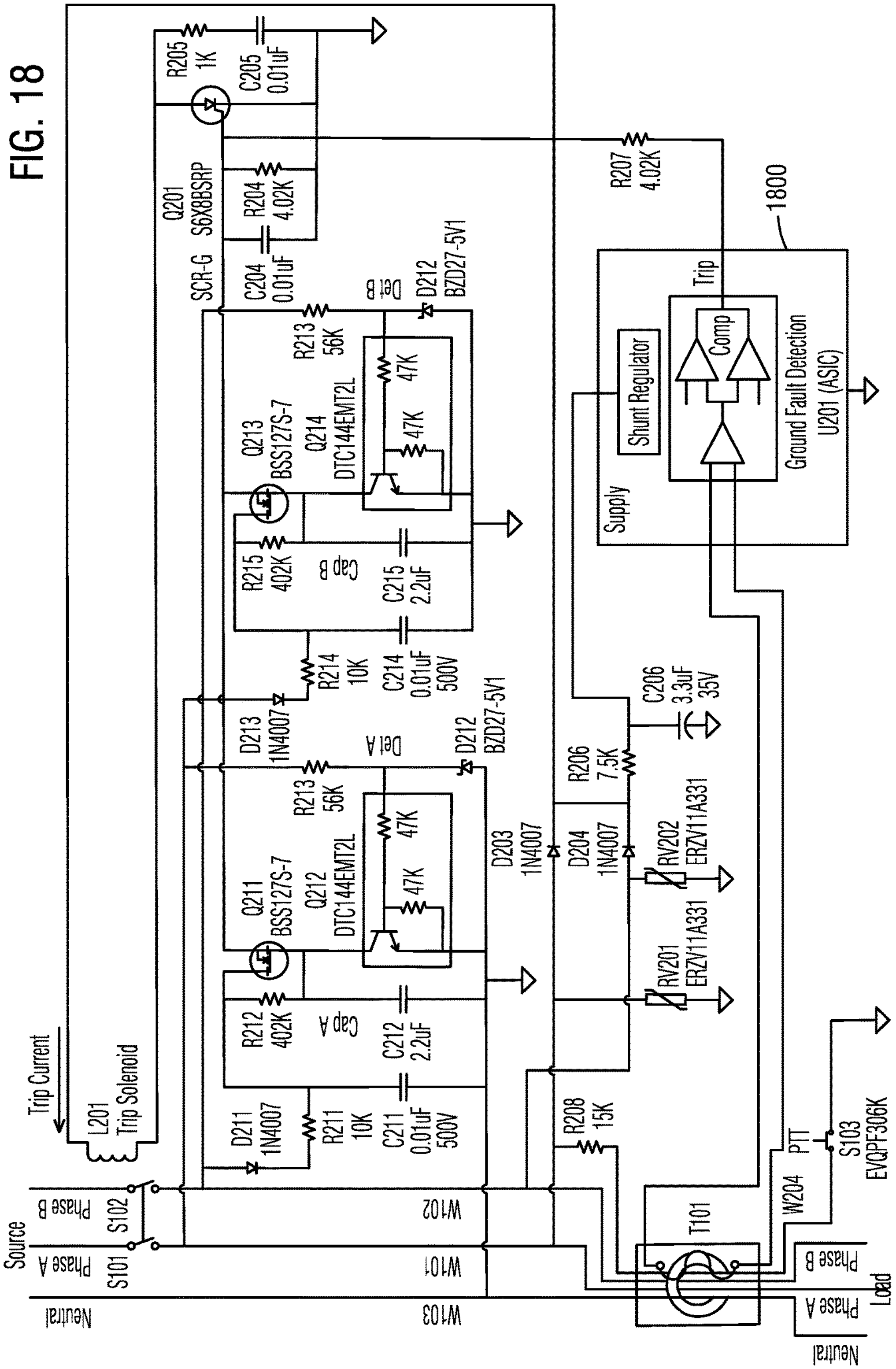
FIG. 18 illustrates a schematic diagram of details of the electronic solid-state common trip failure monitor circuit of the two-pole circuit interrupter shown in FIG. 16 with ground fault detection circuitry in accordance with one illustrative embodiment of the present invention.

As shown, FIG. 18 illustrates a schematic diagram of details of the electronic solid-state common trip failure monitor circuit 1600 of the two-pole circuit interrupter 5 shown in FIG. 16 with ground fault detection circuitry 1800 in accordance with one illustrative embodiment of the present invention. More specifically, FIG. 18 describes a forth embodiment including the ground fault detection circuitry 1800 in the two-pole circuit interrupter 5. The ground fault detection circuitry 1800 may be replaced by an arc fault detection circuit, or possibly a combination ground fault and arc fault detection circuit. The description of the ground fault detection circuitry and/or arc fault detection circuit is omitted in view of brevity. The line voltage detection circuits for PH A and PH B, the supply circuits to the gate of the SCR, and trip circuit function operate in the same manner as described above for the third embodiment in FIGS. 16 and 17.

Shown in FIGS. 19A-19H are graphs of various voltages and a trip current of the electronic solid-state common trip failure monitor circuit 1600 shown in FIG. 16 and FIG. 17 for a 240V AC system for use with the two-pole circuit interrupter 5 in accordance with one illustrative embodiment of the present invention. In FIGS. 20A-20H, graphs of various voltages and a trip current of the electronic solid-state common trip failure monitor circuit 1600 are illustrated for a 208 VAC system for use with the two-pole circuit interrupter 5 in accordance with one illustrative embodiment of the present invention.

Figure 19A:
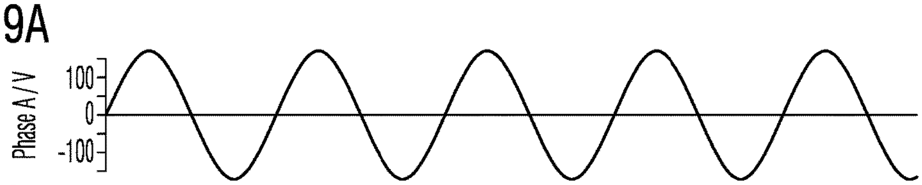
FIGS. 19A-19H illustrate graphs of various voltages and a trip current of the electronic solid-state common trip failure monitor circuit shown in FIG. 16 for a 240 VAC system for use with the two-pole circuit interrupter in accordance with one illustrative embodiment of the present invention.
Figure 19B:
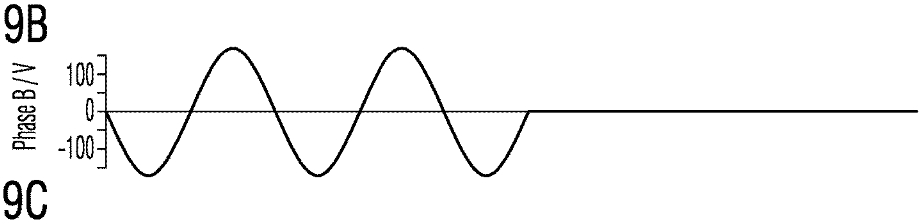
Figure 19C:
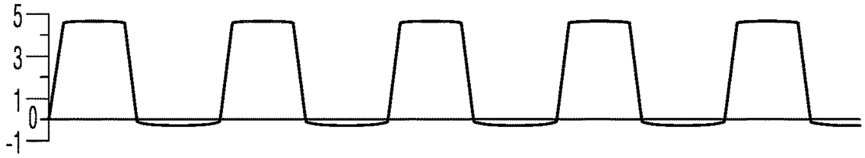
Figure 19D:
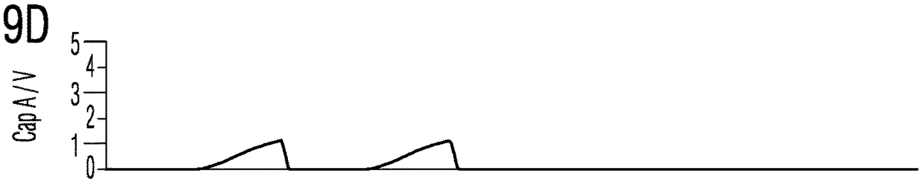
Figure 19E:
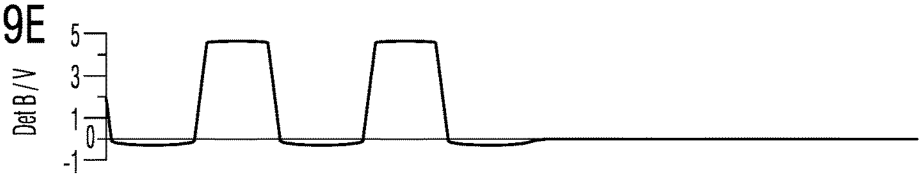
Figure 19F:
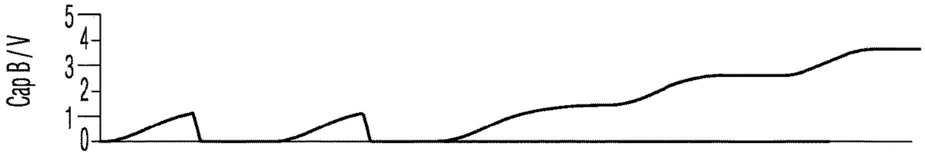
Figure 19G:
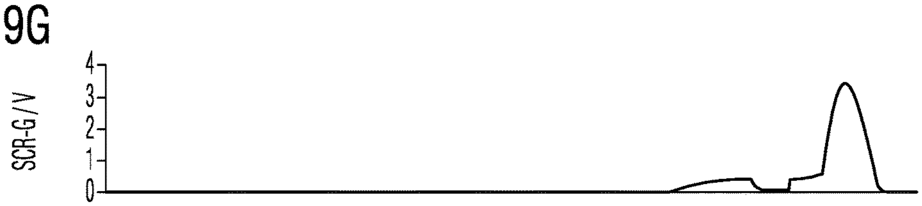
Figure 19H:
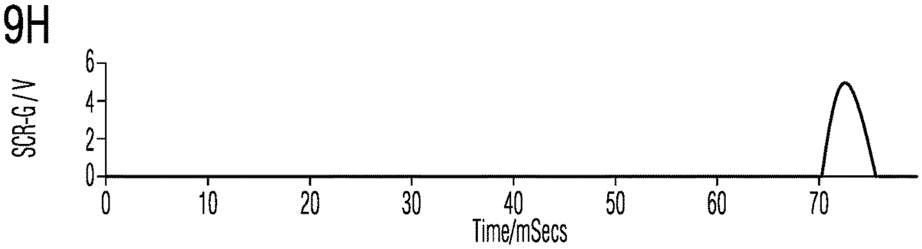
Figures 20A, 20B, 20C, 20D, 20E, 20F, 20G, 20H:
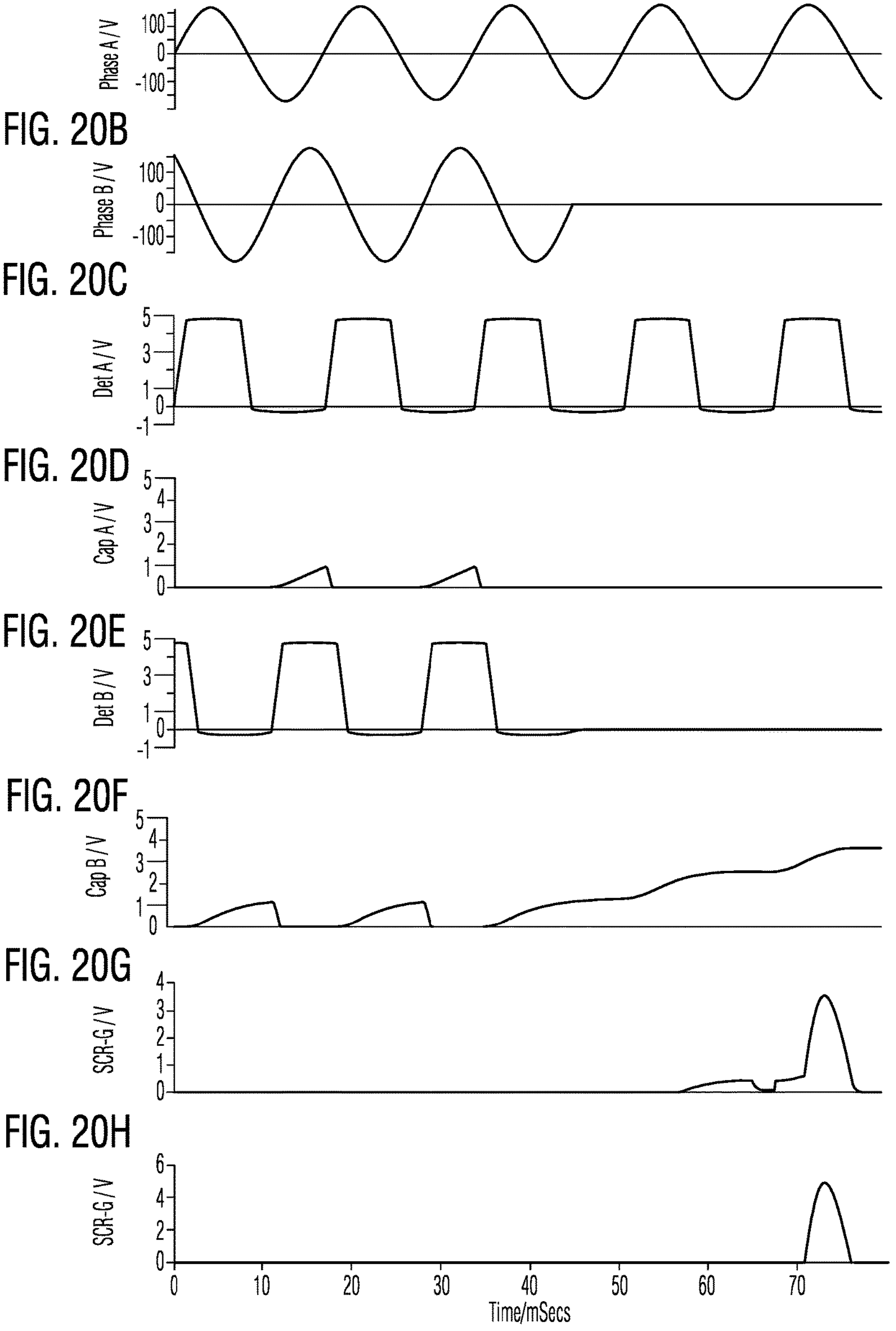
FIGS. 20A-20H illustrate graphs of various voltages and a trip current of the electronic solid-state common trip failure monitor circuit shown in FIG. 16 for a 208 VAC system for use with the two-pole circuit interrupter in accordance with one illustrative embodiment of the present invention.
Figure 21A:
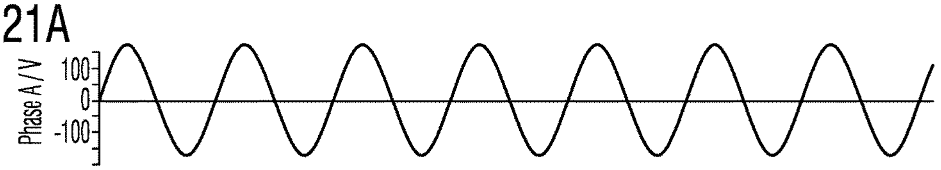
FIGS. 21A-21H illustrate graphs of various voltages and a trip current of the electronic solid-state common trip failure monitor circuit having higher value charging capacitors as shown in FIG. 16 for a 240 VAC system for use with the two-pole circuit interrupter in accordance with one illustrative embodiment of the present invention.
Figure 21B:
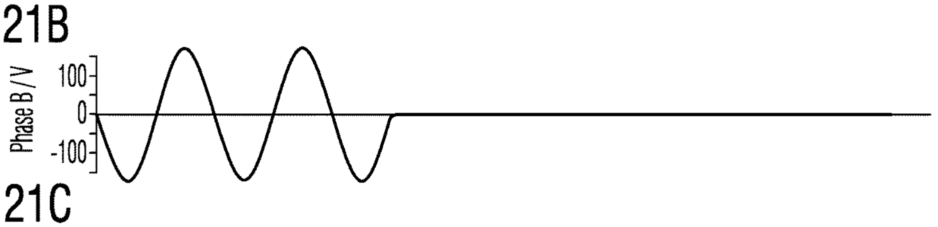
Figure 21C:
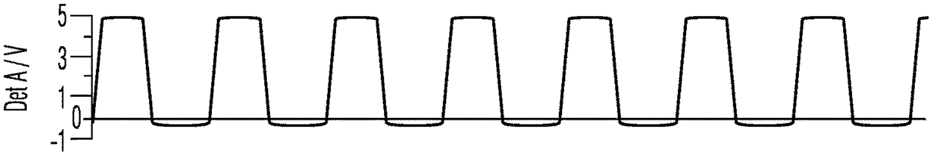
Figure 21D:
Figure 21E:
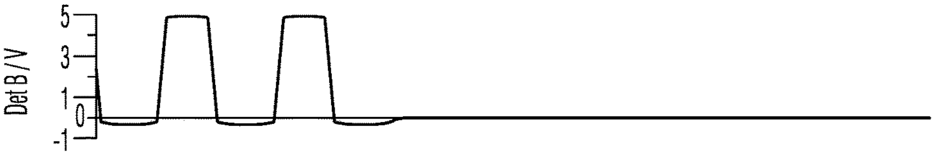
Figure 21F:
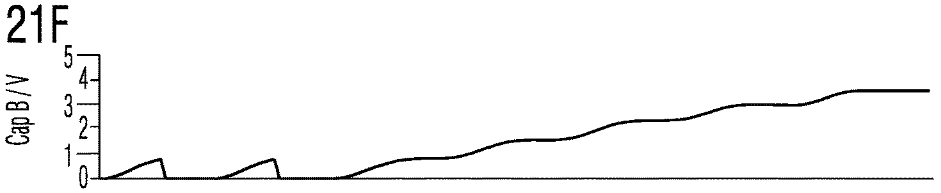
Figure 21G:
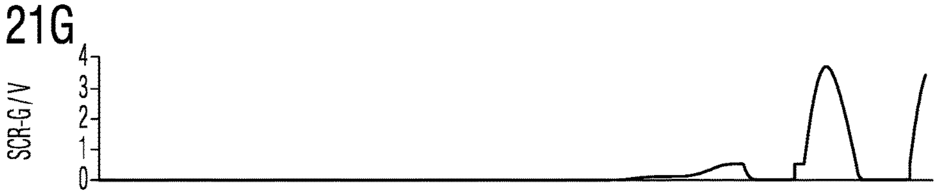
Figure 21H:
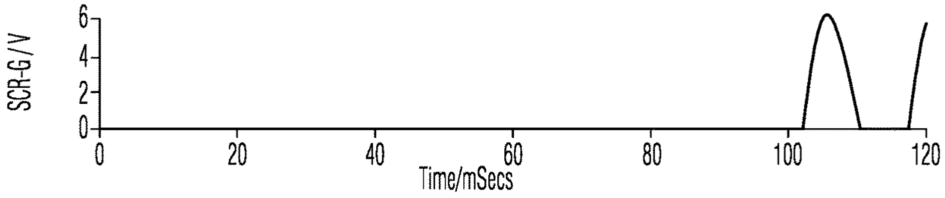
Figure 22A:
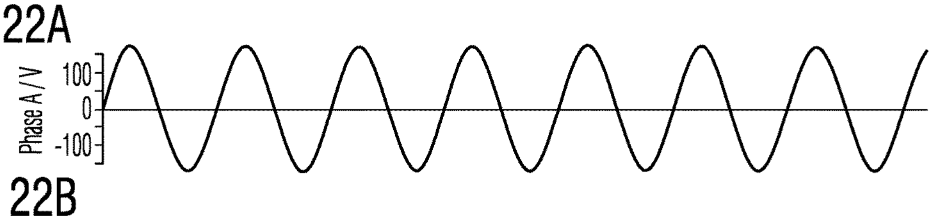
FIGS. 22A-22H illustrate graphs of various voltages and a trip current of the electronic solid-state common trip failure monitor circuit having higher value charging capacitors as shown in FIG. 16 for a 208 VAC system for use with the two-pole circuit interrupter in accordance with one illustrative embodiment of the present invention.
Figure 22B:
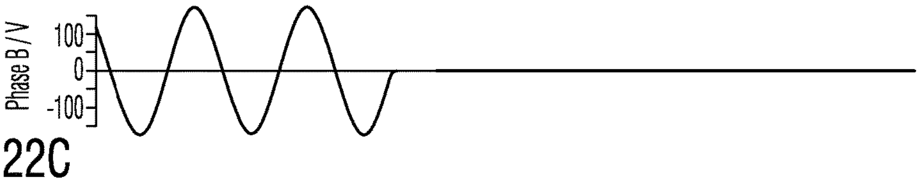
Figure 22C:
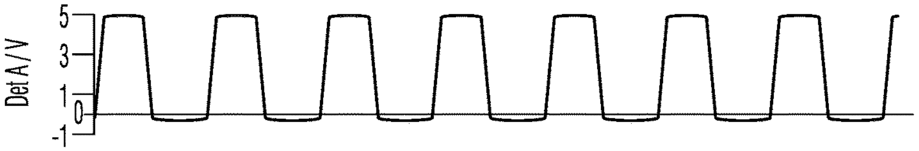
Figure 22D:
Figure 22E:
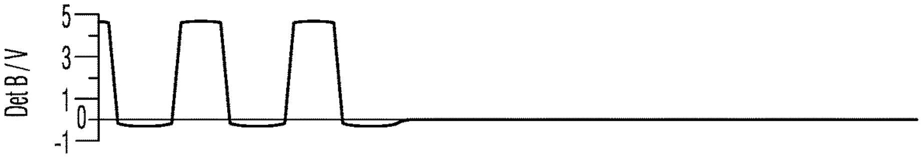
Figure 22F:
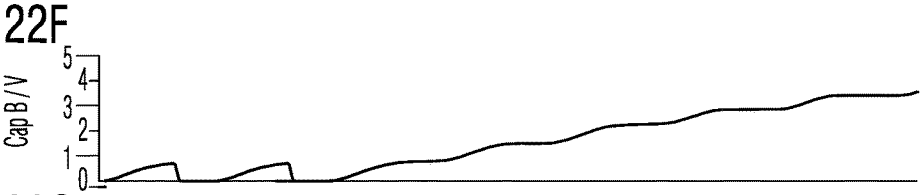
Figure 22G:
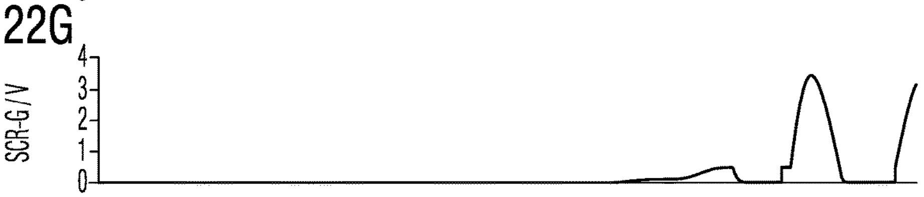
Figure 22H:
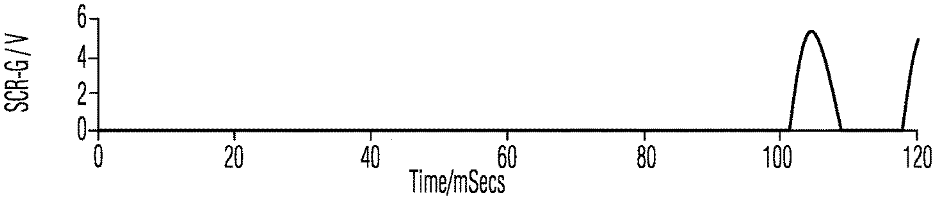

In particular, a case where Phase B is 180 degrees phase shifted from Phase A which is a 240V AC system is described in FIGS. 19A-19H. FIG. 19A shows a voltage (V) of Phase A on the Phase A conductor 1615*a* and FIG. 19B shows a voltage (V) of Phase B on the Phase B conductor 1615*b*. FIG. 19C shows a voltage (V) at a node "DET A." FIG. 19D shows a voltage (V) at a node "CAP A." FIG. 19E shows a voltage (V) at a node "DET B." FIG. 19F shows a voltage (V) at a node "CAP B." FIG. 19G shows a voltage (V) at a node "SCR-Gate" of the SCR (Q101) 1702. FIG. 19H shows a trip current (A) to the trip solenoid (L101) 1640. Likewise, a case where Phase B is 120 degrees phase shifted from Phase A which is a 208V AC system is described in FIGS. 20A-20H.

While 120V AC is present on Phase A, the current induced from node "Ph A" will attempt to charge the capacitor C215 1717*b* at node labeled "Cap B" through the diode D213 1709*b*, the resistor R214 1710*b*, and the resistor R215 1715*b* during the positive half cycles of the line voltage on "Ph A." Likewise, while 120V AC is present on Phase B, the current induced from node "Ph B" will attempt to charge the capacitor C212 1717*a* at node labeled "Cap A" through the diode D211 1709*a*, the resistor R211 1710*a*, and the resistor R212 1715*a* during the positive half cycles of the line voltage on "Ph B." The values of the charge capacitors C215 1717*b* and C212 1717*a* are sufficiently large that the charge voltage potential "due to a single positive half cycle" at the nodes "Cap A" or at "Cap B" does not exceed the gate-to-source voltage of approximately 2 to 3 volts that is required to turn on the MOSFET Q213 1707*b* or the MOSFET Q211 1707*a* respectively. However, if 120V AC is present on Phase A then the voltage at node "Ph A" is detected by the Zener diode D212 1722*a* at the node "Det A" through the resistor R213 1720*a*.

The voltage at the node "Det A" is approximately 5 volts during the positive half cycle of the Phase A thus turning ON the Bipolar switching transistor Q212 1705*a* which discharges the capacitor C212 1717*a* (node Cap A) to the electronics ground 1227 and prevents the MOSFET Q211 1707*a* from turning ON. Otherwise, if 120V AC is not present on Phase A then the capacitor C212 1717*a* would continue to charge until the voltage at "Cap A" exceeds the gate-to-source voltage required to turn on the MOSFET Q211 1707*a*. Therefore, a current of approximately 12 milliamperes is generated from "Ph B" through the diode D211 1709*a*, the resistor R211 1710*a*, and the MOSFET Q211 1707*a* into the gate of SCR Q201 1702 at the node "SCR-G". The current exceeds the required gate trigger current of SCR Q201 1702 thus turning it ON. The resulting trip current labeled "I-trip" energizes the trip solenoid (L201) 1640 and trips the remaining energized pole of the two-pole circuit interrupter 5 thus preventing the hazardous condition described above. In a similar manner, if 120V AC is present on Phase B then the voltage at node "Ph B" is detected by the Zener diode D214 1722*b* at the node "Det B" through the resistor R216 1720*b*.

The voltage at the node "Det B" is approximately 5 volts during the positive half cycle of the Phase B thus turning ON the Bipolar switching transistor Q214 1705*b* which discharges the capacitor C215 1717*b* (node Cap B) to the electronics ground 1227 and prevents the MOSFET Q213 1707*b* from turning ON. Otherwise, if 120V AC is not present on Phase B then the capacitor C215 1717*b* would continue to charge until the voltage at "Cap B" exceeds the gate-to-source voltage required to turn on the MOSFET Q213 1707*b*. Therefore, a current of approximately 12 milliamperes is generated from "Ph A" through diode the D213 1709*b*, the resistor R214 1710*b*, and the MOSFET Q213 1707*b* into the gate of SCR Q201 1702 at the node "SCR-G." The current exceeds the required gate trigger current of SCR Q201 1702 thus turning it ON. The resulting trip current labeled "I-trip" energizes the trip solenoid (L201) 1640 and trips the remaining energized pole of the two-pole circuit interrupter 5 thus preventing the hazardous condition described above.

To demonstrate the above operation, Phase B (Ph B) is switched open at around 42 milliseconds for the case Phase B (Ph-B) is phase shifted 180 degrees from Phase A (Ph A) in FIGS. 19A-19H, and Phase B (Ph B) is switched open at around 44 milliseconds for the case Phase B (Ph B) is phase shifted 120 degrees from Phase A (Ph A) in FIGS. 20A-20H.

The advantage of the first embodiment shown in FIGS. 11 and 12 is that it is a simple circuit comprised of very few components. However, it does not tolerate component variation and line voltage variation on Phase A and Phase B very well. The third embodiment shown in FIGS. 16 and 17 has several advantages over the first embodiment. Component variation and line voltage variation on Phase A or Phase B has little or no affect on the performance of the circuit of the third embodiment shown in FIGS. 16 and 17. In addition, variation in the phase relationship between Phase A and Phase B has no affect on the performance of this circuit either.

Next, FIGS. 21A-21H illustrate graphs of various voltages and a trip current of the electronic solid-state common trip failure monitor circuit 1600 having higher value charging capacitors as shown in FIG. 16 for a 240V AC system for use with the two-pole circuit interrupter 5 in accordance with one illustrative embodiment of the present invention. Likewise, FIGS. 22A-22H illustrate graphs of various voltages and a trip current of the electronic solid-state common trip failure monitor circuit 1600 having higher value charging capacitors as shown in FIG. 16 for a 208V AC system for use with the two-pole circuit interrupter 5 in accordance with one illustrative embodiment of the present invention. FIGS. 21A-21H illustrate the case where Phase B (Ph B) is phase shifted 180 degrees from Phase A (Ph A) and FIGS. 22A-22H illustrates the case where Phase B (Ph B) is phase shifted 120 degrees from Phase A (Ph A).

Another advantage of the circuit of the third embodiment shown in FIGS. 16 and 17 is the time elapsed from when Phase B is switched open to when SCR Q201 1702 is switched ON tripping the remaining energized pole can easily be adjusted by simply adjusting the charging capacitors C212 1717*a* and C215 1717*b*. For example, changing the values of C212 1717*a* and C215 1717*b* from 2.2 microfarads to 3.9 microfarads increased the elapsed time to trip from around 30 milliseconds as shown in FIGS. 19A-19H and FIGS. 20A-20H, to around 60 milliseconds as shown in FIGS. 21A-21H and FIGS. 22A-22H.

Figure 23:
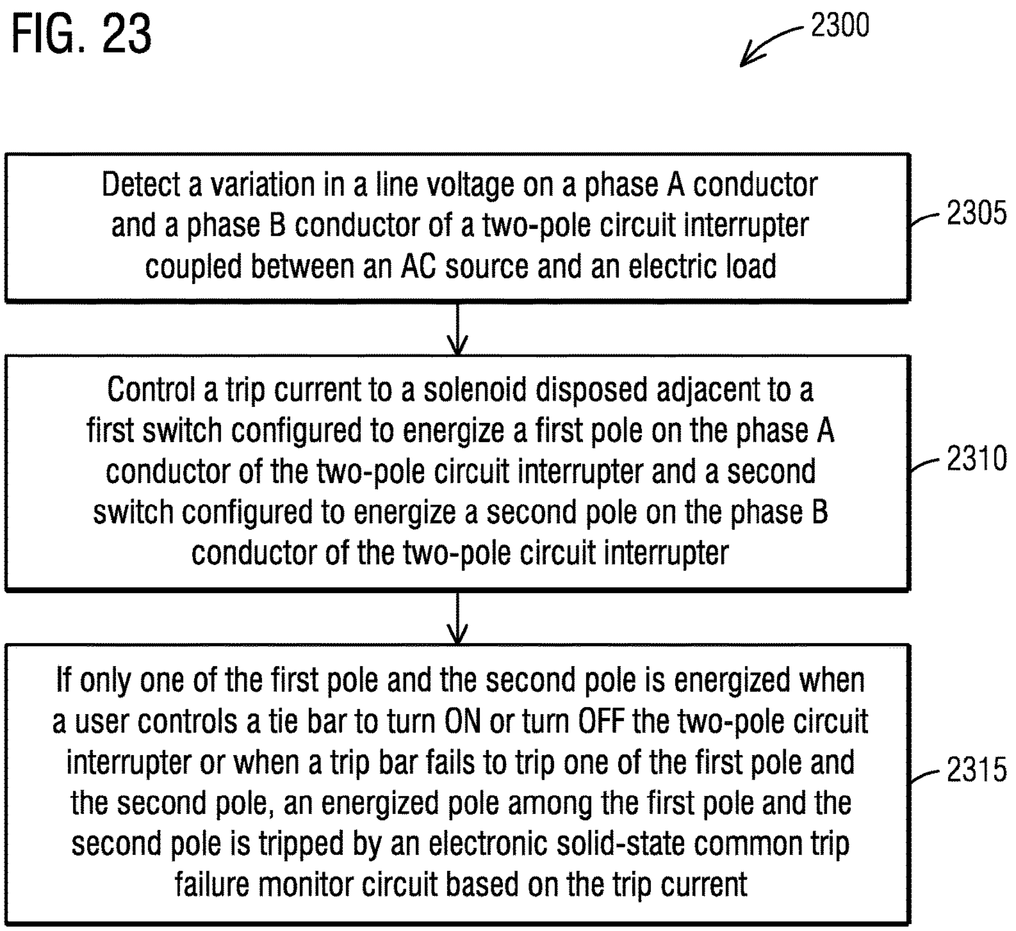
FIG. 23 illustrates a flow chart of a method of monitoring and responding to a trip failure associated with energizing of poles in a multi-pole circuit interrupter in accordance with an exemplary embodiment of the present invention.

FIG. 23 illustrates a flow chart of a method 2300 of monitoring and responding to a trip failure associated with energizing of poles in a multi-pole circuit interrupter such as the two-pole circuit interrupter 5 shown in FIG. 1 in accordance with an exemplary embodiment of the present invention. Reference is made to the elements and features described in FIGS. 1-18. It should be appreciated that some steps are not required to be performed in any particular order, and that some steps are optional.

The method 2300 is configured to handle an abnormal condition associated with energizing of poles of a circuit breaker such as the two-pole circuit interrupter 5. In step 2305, the electronic solid-state common trip failure monitor circuit 10 or 1600 detects a variation in a line voltage on a phase A conductor and a phase B conductor of the two-pole circuit interrupter 5 coupled between an AC source and an electric load. In response to the variation in the line voltage, at step 2310, the electronic solid-state common trip failure monitor circuit 10 or 1600 controls a trip current to a solenoid disposed adjacent to a first switch configured to energize a first pole on the phase A conductor of the two-pole circuit interrupter 5 and a second switch configured to energize a second pole on the phase B conductor of the two-pole circuit interrupter 5. At step 2315, if only one of the first pole and the second pole is energized when a user controls a tie bar to turn ON or turn OFF the two-pole circuit interrupter or when a trip bar fails to trip one of the first pole and the second pole, an energized pole among the first pole and the second pole is tripped by the electronic solid-state common trip failure monitor circuit 10 or 1600 based on the trip current.

In method 2300, detecting a variation in a line voltage on a phase A conductor and a phase B conductor of the two-pole circuit interrupter 5 further comprises generating an output voltage based on a voltage level of the phase A conductor and a voltage level of the phase B conductor using a resistor bridge. Likewise, controlling a trip current to a solenoid further comprises tripping the energized pole among the first pole and the second pole using a silicon controlled rectifier (SCR) having a gate, wherein the SCR is triggered by a current going into the gate. A line voltage detection circuit that detects the variation in the line voltage is isolated from a current-controlling trip circuit that controls the trip current to the solenoid.

In method 2300, according to one embodiment, detecting a variation in a line voltage on a phase A conductor and a phase B conductor of the two-pole circuit interrupter 5 further comprises following two steps. First, a change in a voltage level of the phase A conductor is detected using a first line voltage detection circuit disposed on a load side of the first switch and the second switch. Simultaneously, a change in a voltage level of the phase B conductor is detected with a second line voltage detection circuit disposed on the load side of the first switch and the second switch.

Embodiments of the present invention apply to two-pole circuit breakers (Mechanical pole, GFCI, or CAFCI) in that it adds a valuable safety feature. This safety feature could be included in any of GFCI or AFCI multi-pole circuit breakers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms “comprises,” “comprising,” “includes,” “including,” “has,” “having” or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases “in one embodiment,” “in an embodiment,” or “in a specific embodiment” or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A multi-pole circuit interrupter configured to be coupled between an AC source and an electric load, the multi-pole circuit interrupter comprising:

- a tie bar mechanically coupling a first handle of a first pole circuit interrupter of the multi-pole circuit interrupter to a second handle of a second pole circuit interrupter of the multi-pole circuit interrupter so that both poles turn on and off together;
- a trip bar mechanically coupling a first trip arm of the first pole circuit interrupter to a second trip arm of the second pole circuit interrupter so that the both poles trip off together should one of the first pole circuit interrupter or the second pole circuit interrupter trip due to an over current condition;
- a first switch to energize a first pole on a phase A conductor of the multi-pole circuit interrupter;
- a second switch to energize a second pole on a phase B conductor of the multi-pole circuit interrupter; and
- an electronic solid-state circuit coupled to the phase A conductor and the phase B conductor to detect a line voltage variation and control a current to a device in response to trip an energized pole among the first pole and the second pole if only one of the first pole and the second pole is energized when a user controls the tie bar to turn on or turn off the multi-pole circuit interrupter or when the trip bar fails to trip one of the first pole and the second pole.

2. The multi-pole circuit interrupter of claim 1, wherein the electronic solid-state circuit further comprising:

- a line voltage detection circuit disposed on a load side of the first switch and the second switch, the line voltage detection circuit is configured to detect a change in a voltage level of the phase A conductor and a change in a voltage level of the phase B conductor.

3. The multi-pole circuit interrupter of claim 2, wherein the line voltage detection circuit is a resistor bridge that provides an output voltage based on the voltage level of the phase A conductor and the voltage level of the phase B conductor.

4. The multi-pole circuit interrupter of claim 2, wherein the resistor bridge includes first, second, third resistors of equal value.

5. The multi-pole circuit interrupter of claim 2, wherein the electronic solid-state circuit further comprising:

- a trip solenoid disposed adjacent to the first switch and the second switch, the trip solenoid having a first terminal and a second terminal.

6. The multi-pole circuit interrupter of claim 5, wherein the electronic solid-state circuit further comprising:

- a current-controlling trip circuit coupled to the first terminal of the trip solenoid, the current-controlling trip circuit to provide a trip current to energize the trip solenoid to trip the energized pole among the first pole and the second pole.

7. The multi-pole circuit interrupter of claim 6, wherein the electronic solid-state circuit further comprising:

- an isolation circuit coupled between the line voltage detection circuit and the current-controlling trip circuit to isolate the line voltage detection circuit from the current-controlling trip circuit.

8. The multi-pole circuit interrupter of claim 6, wherein the electronic solid-state circuit further comprising:

- a surge protection circuit coupled to the phase A conductor, the phase B conductor and the second terminal of the trip solenoid.

9. The multi-pole circuit interrupter of claim 6, wherein the current-controlling trip circuit includes a silicon controlled rectifier (SCR) having a gate, wherein the SCR is triggered by a current going into the gate.

10. The multi-pole circuit interrupter of claim 1, wherein the electronic solid-state circuit further comprising:

- at least one of a ground fault detection circuit and an arc fault detection circuit.

11. A multi-pole circuit interrupter configured to be coupled between a source and a load, the multi-pole circuit interrupter comprising:

a first switch to energize a first pole on a phase A conductor of the multi-pole circuit interrupter;

a second switch to energize a second pole on a phase B conductor of the multi-pole circuit interrupter;

a first line voltage detection circuit disposed on a load side of the first switch and the second switch, the first line voltage detection circuit is configured to detect a change in a voltage level of the phase A conductor;

a second line voltage detection circuit disposed on a load side of the first switch and the second switch, the second line voltage detection circuit is configured to detect a change in a voltage level of the phase B conductor; and a trip circuit configured to control a current to trip an energized pole among the first pole and the second pole if only one of the first pole and the second pole is energized when a user controls a tie bar to turn on or turn off the multi-pole circuit interrupter or when a trip bar fails to trip one of the first pole and the second pole.

12. The multi-pole circuit interrupter of claim 11, wherein the trip circuit further comprising:

a trip solenoid disposed adjacent to the first switch and the second switch, the trip solenoid having a first terminal and a second terminal.

13. The multi-pole circuit interrupter of claim 12, wherein the trip circuit further comprising:

a current-controlling circuit coupled to the first terminal of the trip solenoid, the current-controlling circuit to provide a trip current to energize the trip solenoid to trip the energized pole among the first pole and the second pole.

14. The multi-pole circuit interrupter of claim 13, wherein the current-controlling circuit includes a silicon controlled rectifier (SCR) having a gate, wherein the SCR is triggered by a current going into the gate.

15. The multi-pole circuit interrupter of claim 12, further comprising:

a surge protection circuit coupled to the phase A conductor, the phase B conductor and the second terminal of the trip solenoid.

16. A method of handling an abnormal condition associated with energizing of poles of a circuit breaker, the method comprising:

detecting a variation in a line voltage on a phase A conductor and a phase B conductor of a multi-pole circuit interrupter coupled between an AC source and an electric load;

controlling a trip current to a solenoid disposed adjacent to a first switch configured to energize a first pole on the phase A conductor of the multi-pole circuit interrupter and a second switch configured to energize a second pole on the phase B conductor of the multi-pole circuit interrupter in response to the variation in the line voltage; and tripping an energized pole among the first pole and the second pole based on the trip current if only one of the first pole and the second pole is energized when a user controls a tie bar to turn on or turn off the multi-pole circuit interrupter or when a trip bar fails to trip one of the first pole and the second pole.

17. The method of claim 16, wherein detecting a variation in a line voltage on a phase A conductor and a phase B conductor of a multi-pole circuit interrupter further comprising:

generating an output voltage based on a voltage level of the phase A conductor and a voltage level of the phase B conductor using a resistor bridge.

18. The method of claim 16, wherein controlling a trip current to a solenoid further comprising:

tripping the energized pole among the first pole and the second pole using a silicon controlled rectifier (SCR) having a gate, wherein the SCR is triggered by a current going into the gate.

19. The method of claim 16, further comprising:

isolating a line voltage detection circuit that detects the variation in the line voltage and a current-controlling trip circuit that controls the trip current to the solenoid.

20. The method of claim 16, wherein detecting a variation in a line voltage on a phase A conductor and a phase B conductor of a multi-pole circuit interrupter further comprising:

detecting a change in a voltage level of the phase A conductor using a first line voltage detection circuit disposed on a load side of the first switch and the second switch; and detecting a change in a voltage level of the phase B conductor with a second line voltage detection circuit disposed on the load side of the first switch and the second switch.

* * * * *